US012608141B2

(12) United States Patent
Lee et al.

(10) Patent No.: US 12,608,141 B2
(45) Date of Patent: Apr. 21, 2026

(54) STORAGE CONTROLLER AND METHOD OF PROVIDING FIRMWARE IMAGE

(71) Applicant: SAMSUNG ELECTRONICS CO., LTD., Suwon-si (KR)

(72) Inventors: Yongjae Lee, Suwon-si (KR); Dongbin Park, Suwon-si (KR); Wonje Heo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/232,618

(22) Filed: Aug. 10, 2023

(65) Prior Publication Data

US 2024/0152284 A1     May 9, 2024

(30) Foreign Application Priority Data

Nov. 4, 2022    (KR) ........................ 10-2022-0146292
Feb. 7, 2023    (KR) ........................ 10-2023-0015881

(51) Int. Cl.
*G06F 3/06* (2006.01)
*H04L 9/30* (2006.01)

(52) U.S. Cl.
CPC .......... *G06F 3/0622* (2013.01); *G06F 3/0655* (2013.01); *G06F 3/0679* (2013.01); *H04L 9/30* (2013.01)

(58) Field of Classification Search
CPC .... G06F 3/0622; G06F 3/0655; G06F 3/0679; H04L 9/30
See application file for complete search history.

(56) References Cited

U.S. PATENT DOCUMENTS

| | | | |
|---|---|---|---|
| 7,069,452 B1* | 6/2006 | Hind ...................... G06F 21/572 | |
| | | | 713/1 |
| 7,751,568 B2 | 7/2010 | Catherman et al. | |
| 9,600,302 B2 | 3/2017 | Watsen | |
| 10,313,132 B2 | 6/2019 | Lee et al. | |
| 10,339,318 B2 | 7/2019 | Zhang et al. | |
| 11,520,891 B1* | 12/2022 | Karolitsky ............ H04L 9/3247 | |
| 2010/0174909 A1* | 7/2010 | Ashdown .................. H04L 9/14 | |
| | | | 713/181 |
| 2019/0073478 A1* | 3/2019 | Khessib .............. G06F 13/4282 | |
| 2019/0189236 A1 | 6/2019 | Poliakov et al. | |
| 2019/0227749 A1 | 7/2019 | Wakchaure et al. | |
| 2021/0117545 A1* | 4/2021 | Kim .......................... G06F 8/63 | |
| 2021/0223968 A1* | 7/2021 | Umesawa ............. H04L 9/3263 | |

(Continued)

FOREIGN PATENT DOCUMENTS

| | | |
|---|---|---|
| KR | 10-2208141 B1 | 1/2021 |
| KR | 10-2023-0107044 A | 7/2023 |

*Primary Examiner* — Kalpit Parikh

(74) *Attorney, Agent, or Firm* — Sughrue Mion, PLLC

(57) ABSTRACT

A storage controller configured to control a nonvolatile memory includes a one-time programmable (OTP) memory configured to store a first public key, and a processor configured to, based on a first signature added to a firmware image including a host authentication public key being verified using the first public key, receive a storage command including at least one second public key and a first host authentication signature for the at least one second public key and store the at least one second public key in the OTP memory based on the first host authentication signature being verified using the host authentication public key.

15 Claims, 17 Drawing Sheets

(56)     References Cited

U.S. PATENT DOCUMENTS

| | | | |
|---|---|---|---|
| 2022/0067166 A1* | 3/2022 | Kwon | G06F 21/64 |
| 2022/0294644 A1 | 9/2022 | Liu et al. | |
| 2023/0049387 A1* | 2/2023 | Liu | H04L 63/123 |
| 2023/0222219 A1 | 7/2023 | Park et al. | |
| 2024/0005004 A1* | 1/2024 | Abdulhamid | G06F 8/65 |

* cited by examiner

| State value | Verification State | Verify SIGN_V | Verify SIGN_C | Allow FW_SS |
|:-----------:|:------------------:|:-------------:|:-------------:|:-----------:|
| 1 | Single signing | O | X | O |
| 2 | Dual signing ready | O | O | O |
| 3 | Dual signing | O | O | X |

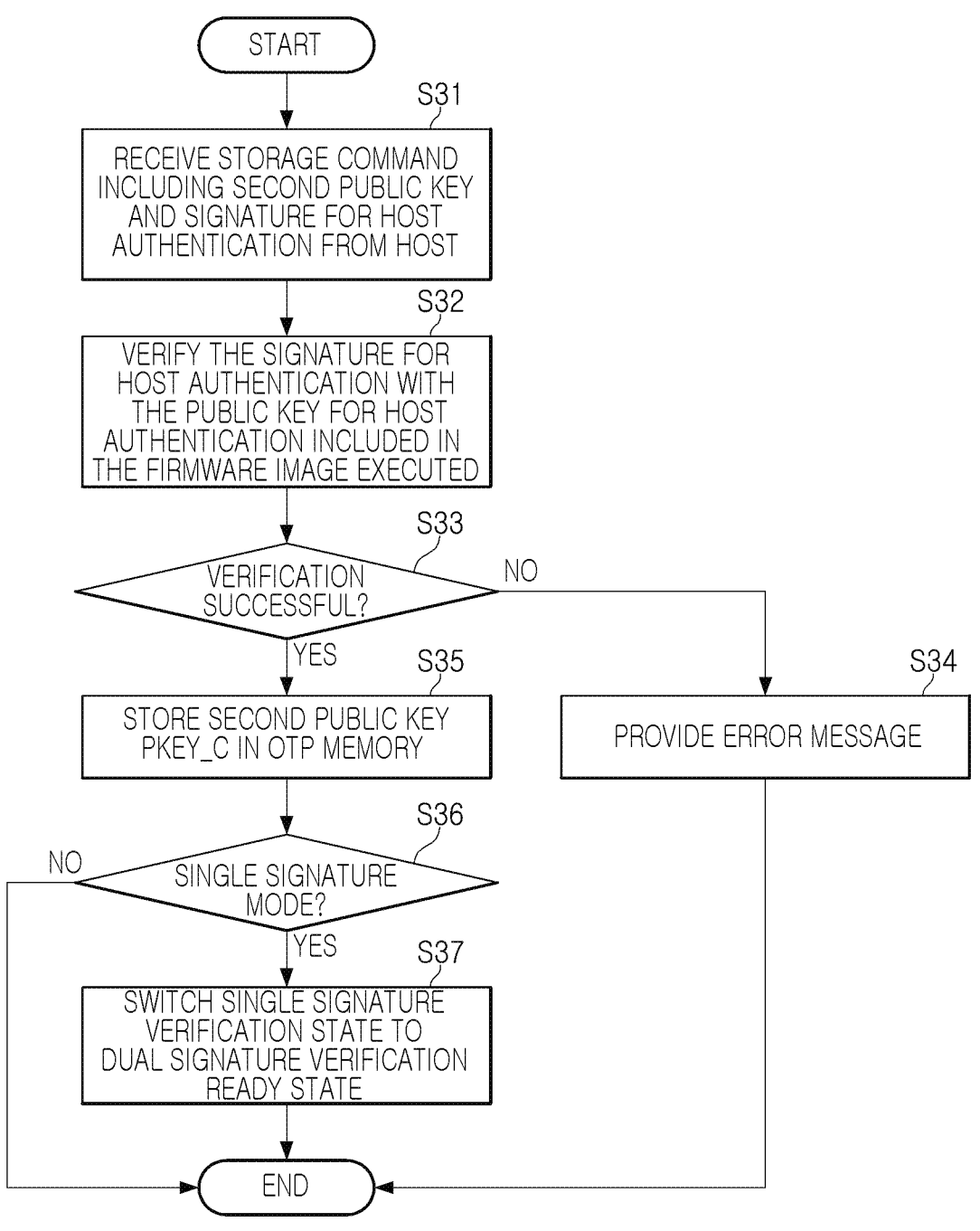

START

S31
RECEIVE STORAGE COMMAND
INCLUDING SECOND PUBLIC KEY
AND SIGNATURE FOR HOST
AUTHENTICATION FROM HOST

S32
VERIFY THE SIGNATURE FOR
HOST AUTHENTICATION WITH
THE PUBLIC KEY FOR HOST
AUTHENTICATION INCLUDED IN
THE FIRMWARE IMAGE EXECUTED

S33
VERIFICATION
SUCCESSFUL?          NO

YES          S35
STORE SECOND PUBLIC KEY
PKEY_C IN OTP MEMORY

S34
PROVIDE ERROR MESSAGE

S36
NO          SINGLE SIGNATURE
MODE?

YES          S37
SWITCH SINGLE SIGNATURE
VERIFICATION STATE TO
DUAL SIGNATURE VERIFICATION
READY STATE

END

FIG. 7A

STORAGE CONTROLLER AND METHOD OF PROVIDING FIRMWARE IMAGE

CROSS-REFERENCE TO RELATED APPLICATION(S)

This application is based on and claims priority to Korean Patent Application No. 10-10-2023-0015881, filed on Feb. 7, 2023 and Korean Patent Application No. 10-2022-0146292, filed on Nov. 4, 2022 in the Korean Intellectual Property Office, the disclosures of which are incorporated herein by reference in their entireties.

BACKGROUND

1. Field

Example embodiments of the present disclosure relate to a storage controller and a method of providing a firmware image.

2. Description of Related Art

Firmware may refer to a program controlling hardware. Firmware may be provided into a storage space within hardware when the hardware is manufactured. Attacks on systems, including firmware and hardware, may be attempted in a variety of manners. Attackers may cause a system to perform an operation intended by the attackers by changing at least a portion of firmware of the system. To provide security against an attack to change firmware, a system may perform authentication on firmware before executing the firmware, and may perform authentication on updated firmware when downloading the updated firmware from an external entity.

Information disclosed in this Background section has already been known to or derived by the inventors before or during the process of achieving the embodiments of the present application, or is technical information acquired in the process of achieving the embodiments. Therefore, it may contain information that does not form the prior art that is already known to the public.

SUMMARY

One or more example embodiments provides a storage controller which may enter a host public key for authenticating a firmware image to which a signature of a host is added without intervention of a firmware vendor.

One or more example embodiments provides a storage controller having improved security by authenticating a firmware image to which a signature of a host is added using a host public key entered by a valid host.

One or more example embodiments provides a storage controller which may have improved versatility and security by verifying only a single signature of a firmware vendor in a firmware image at the time of shipment, and switching to verify a dual signature of a firmware vendor and a host in the firmware image in response to entering of a host public key.

One or more example embodiments provides a method for providing a firmware image by which a host may generate dual-signed firmware verifiable by a storage controller without intervention of a firmware vendor and may provide the generated firmware to a storage device.

Additional aspects will be set forth in part in the description which follows and, in part, will be apparent from the description, or may be learned by practice of the presented embodiments.

According to an aspect of an example embodiment, a storage controller configured to control a nonvolatile memory may include a one-time programmable (OTP) memory configured to store a first public key, and a processor configured to, based on a first signature added to a firmware image including a host authentication public key being verified using the first public key, receive a storage command including at least one second public key and a first host authentication signature for the at least one second public key and store the at least one second public key in the OTP memory based on the first host authentication signature being verified using the host authentication public key.

According to an aspect of an example embodiment, a storage controller configured to control a nonvolatile memory may include an OTP memory configured to store a first public key and a second public key, a buffer memory configured to buffer an update firmware image received from a host, and a processor configured to authenticate the update firmware image using the first public key and the second public key and control the non-volatile memory to store the update firmware image based on the authentication being completed, where the second public key is authenticated using a host authentication public key for included in an existing firmware image and the existing firmware image includes a firmware image authenticated using at least the first public key.

According to an aspect of an example embodiment, a method of providing a dual signed firmware image to a storage device may include generating a first key pair including a first public key for customer authentication and a first private key for customer authentication, providing the first public key for customer authentication to a firmware vendor, generating a second key pair inducing a customer public key and a customer private key, generating a customer authentication signature for the customer public key using the first private key for customer authentication, providing a storage command including the customer public key and the customer authentication signature to the storage device, obtaining a first firmware image including a second public key for customer authentication and a vendor signature that is added to the first firmware image by the firmware vendor, adding a first customer signature to the first firmware image using the customer private key and providing the first firmware image to which the vendor signature and the first customer signature are added to the storage device.

According to an aspect of an example embodiment, a storage controller configured to control a nonvolatile memory may include an OTP memory configured to store a first public key, a processor configured to, based on a first signature added to a firmware image including a host authentication public key being verified using the first public key, receive a storage command including a second public key and a host authentication signature for the second public key and store a first digest of the second public key in the OTP memory based on the host authentication signature being verified using the host authentication public key, and a buffer memory configured to buffer an update firmware image to which a second signature, a third signature and the second public key are added, where the processor may be further configured to verify the second signature using the first public key, generate a second digest of the second public key added to the update firmware image, verify the third signature using the second public key based on the second public key added to the update firmware image being authenticated by comparing the second digest with the first digest stored in the OTP memory, and control the nonvolatile memory to store the update firmware image based on verification of the second signature and verification of the third signature being completed.

BRIEF DESCRIPTION OF DRAWINGS

The above and other aspects, features, and advantages of certain example embodiments of the present disclosure will be more apparent from the following description taken in conjunction with the accompanying drawings, in which:

FIG. 7A is a flowchart illustrating a method of entering a second public key of a storage device according to an example embodiment of the present disclosure;

DETAILED DESCRIPTION

Figure 1:
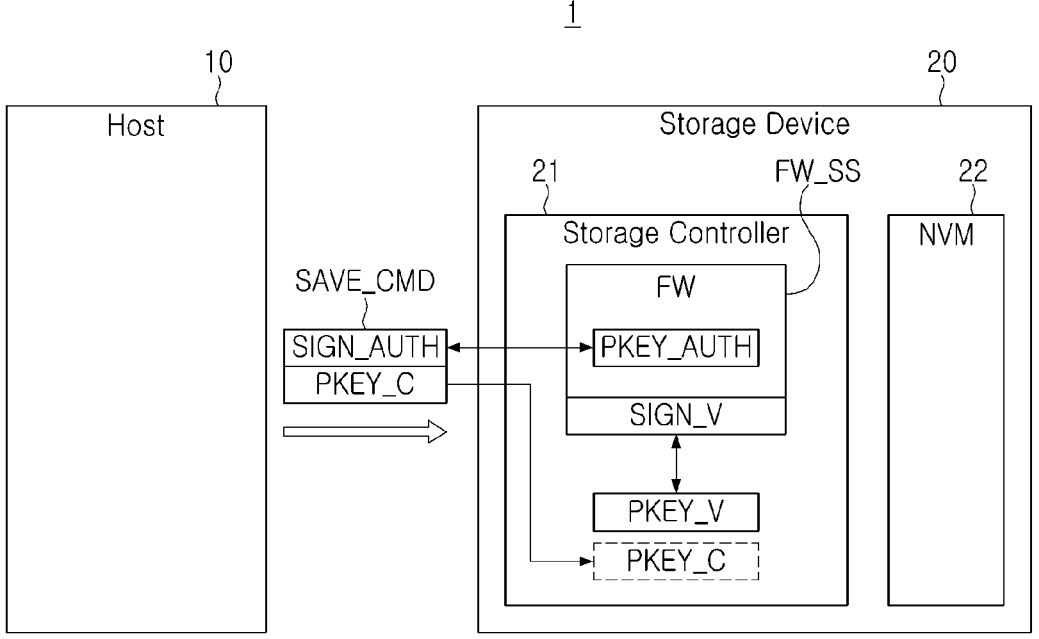
FIG. 1 is a diagram illustrating a storage system according to an example embodiment of the present disclosure.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

FIG. 1 is a diagram illustrating a storage system according to an example embodiment.

The storage system 1 may include a host 10 and a storage device 20. The storage device 20 may include a storage controller 21 and a nonvolatile memory 22 (shown as NVM 22).

The host 10 may include at least one core for processing commands (e.g., executing instructions). For example, the host 10 may include an application processor, a micropro-cessor, a central processing unit (CPU), a processor core, a multi-core processor, a multiprocessor, an application-spe-cific integrated circuit (ASIC), and a field programmable gate array (FPGA).

The storage device 20 may include storage media for storing data in response to a request of the host 10. For example, the storage device 20 may include at least one of a solid state drive (SSD), an embedded memory, and a removable external memory. When the storage device 20 is implemented as an SSD, an embedded memory, or an external memory, the storage device 20 may further include a nonvolatile memory device. When the storage device 20 is implemented as an SSD, the storage device 20 may be a device conforming to the non-volatile memory express (NVMe) standard. When the storage device 20 is imple-mented as an embedded memory or an external memory, the storage device 20 may be a device conforming to a universal flash storage (UFS) or an embedded multi-media card (eMMC) standard. Each of the host 10 and the storage device 20 may generate and transfer packets according to employed standard protocols.

The storage controller 21 may control overall operations of the storage device 20. For example, the storage controller 21 may store data in the nonvolatile memory 22 in response to a request from the host 10, and may transfer data stored in the nonvolatile memory 22 to the host 10 in response to a request from the host 10.

When the nonvolatile memory 22 of the storage device 20 includes a flash memory, the flash memory may include a two-dimensional (2D) NAND memory array or a three-dimensional (3D) (or vertical) NAND (VNAND) memory array. As another example, the storage device 20 may include other various types of nonvolatile memories. For example, as the storage device 20, a magnetic random access memory (RAM) (MRAM), spin-transfer torque (MRAM), conductive bridging RAM (CBRAM), ferroelectric RAM (FeRAM), phase RAM (PRAM), resistive RAM, and other various types of memory may be applied.

The storage controller 21 may execute firmware. Firm-ware may refer to software controlling the storage device 20. For example, the firmware of the storage device 20 may include a host interface layer (HIL), a flash translation layer (FTL), and a flash interface layer (FIL). The HIL may manage data transmission between the host 10 and the storage controller 21, the FTL may convert a logical address received from the host 10 into a physical address of the nonvolatile memory 22, and the FIL may manage data transfer between the storage controller 21 and the nonvolatile memory 22.

To provide security against an attack to change firmware, a firmware vendor may add a first signature SIGN_V to a firmware image FW. For example, the firmware vendor may be a manufacturer of the storage device 20, a manufacturer of the storage system 1, or a supplier of firmware. The storage controller 21 may authenticate the firmware image FW using a first public key PKEY_y for verifying the first signature SIGN_V, and may update or execute only the authenticated firmware image FW. The first public key PKEY_y may be stored in a one-time programmable (OTP) memory in the storage device 20 such that the storage controller 21 may verify the first signature SIGN_V. The firmware image FW to which the first signature SIGN_V is added may be referred to as a single signed firmware image FW_SS.

The host 10 may obtain a single signed firmware image FW_SS from a firmware vendor and may transfer the single signed firmware image FW_SS to the storage device 20 to update the firmware. The host 10 may be a customer who receives the storage device 20 from the manufacturer of the storage device 20 and directly uses the storage device 20 or sells the storage device 20 to a third party.

The host 10 may verify the single signed firmware image FW_SS through a security audit procedure for the single signed firmware image FW_SS distributed by the firmware vendor, and may desire the storage device 20 to execute only a security-verified firmware image FW. For example, the host 10 may add a second signature to a single signed firmware image FW_SS of which security has been verified. The host 10 may desire the storage device 20 to verify the firmware image FW by verifying the first signature SIGN_V as well as the second signature, and to update or execute only the verified firmware image FW. The firmware image to which the first signature SIGN_V and the second signature are added may be referred to as a dual signed firmware image.

In order for the storage device 20 to verify the second signature, the second public key generated by the host 10 may need to be previously stored in an internal OTP memory. In the case in which the manufacturer of the storage device 20 directly enters a second public key of customer into the OTP memory at a time during the manufacturing the storage device 20, it may be difficult to supply the storage device 20 to another customer. That is, versatility of the storage device 20 may deteriorate. Accordingly, the storage device 20 may be manufactured to verify only a single signature of the firmware vendor, and after shipment, the state of the storage device 20 may be changed to verify the dual signature of the firmware vendor and the host 10 according to selection of the host 10.

In the case in which it is not possible to verify whether the second public key entered into the storage device 20 is entered from the valid host 10, attackers may attempt an attack to change the firmware by entering their public key into the storage device 20 and updating the firmware to which their signature is added.

In an example embodiment, the host 10 may transfer the public key PKEY_AUTH for host authentication (i.e., the host authentication public key) to the firmware vendor, such that the firmware image FW stored in the storage device 20 may include the public key PKEY_AUTH for host authentication. Since the first signature SIGN_V is added to (or included in) the firmware image FW, the public key PKEY_

AUTH for host authentication included in the firmware image FW may be a public key of a valid customer approved by the firmware vendor. In the example embodiment, the public key PKEY_AUTH for host authentication may also be referred to as a public key for customer authentication.

The host 10 may provide a storage command SAVE_CMD to which a signature SIGN_AUTH for host authentication (i.e., a host authentication signature) is added to (or included in) the storage device 20 to enter the second public key PKEY_C. The storage controller 21 may authenticate the command SAVE_CMD by verifying the signature SIGN_AUTH for host authentication using the public key PKEY_AUTH for host authentication included in the existing firmware image FW. The second public key PKEY_C included in the authenticated command SAVE_CMD may be stored in the OTP memory.

To update the firmware, the host 10 may add a first signature SIGN_V to the firmware image to be updated, and may also add a second signature which may be verified with a second public key PKEY_C, thereby creating a dual signed firmware image. The storage device 20 may authenticate the dual signed firmware image with a second public key PKEY_C and may update only the authenticated firmware image.

In an example embodiment, the storage device 20 may authenticate the second public key PKEY_C received from the host 10 using the public key PKEY_AUTH for host authentication included in the firmware image FW authenticated from the firmware vendor. Accordingly, only the second public key PKEY_C received from a valid customer approved by the firmware vendor may be stored in the storage device 20. Accordingly, security of the storage device 20 for a dual signed firmware image may be improved.

The host 10 may provide the storage command SAVE_CMD, generated by the host 10 itself, to the storage device 20 without requesting the firmware vendor to enter the second public key PKEY_C into the storage device 20. Accordingly, convenience of the host 10 to enter the second public key PKEY_C may be improved.

A public key of a specific customer for host authentication PKEY_AUTH, included in the firmware image FW stored in the storage device 20, may be modified with a public key for host authentication of another customer as the firmware vendor provides an updated firmware image. Accordingly, versatility of the storage device 20 may be improved.

Hereinafter, an example of a method of adding a signature to a firmware image is described with reference to FIG. 2, and an example of a method of verifying a signature added to (or included in) a firmware image is described with reference to FIG. 3.

Figures 2, 3:
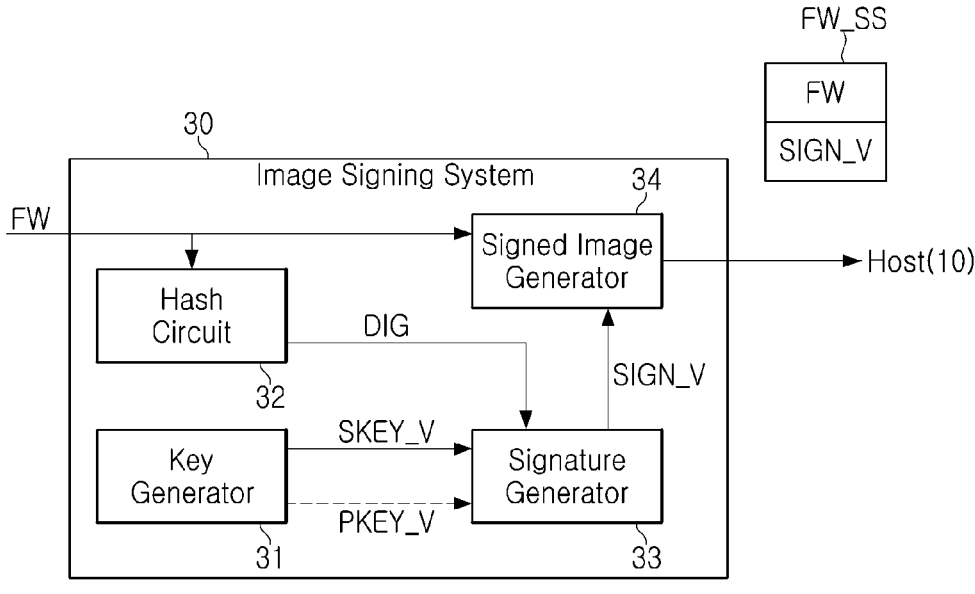
FIG. 2 is a diagram illustrating an image signature system according to an example embodiment of the present disclosure.
FIG. 3 is a diagram illustrating a method of verifying a signature according to an example embodiment of the present disclosure.

FIG. 2 is a diagram illustrating an image signature system according to an example embodiment.

The image signature system 30 in FIG. 2 may be included in the firmware vendor described with reference to FIG. 1. When the image signature system 30 is included in the firmware vendor, the image signature system 30 may receive a firmware image FW and may generate a single signed firmware image FW_SS transferred to the host 10. The image signature system 30 may be included in the host 10 described with reference to FIG. 1. When the image signature system 30 is included in the host 10, the image signature system 30 may receive a single signed firmware image and may generate a dual signed firmware image. Hereinafter, a method of generating a signature will be described based on the example in which the image signature system 30 is included in the firmware vendor.

The image signature system 30 may be implemented in an arbitrary computing system. For example, each of the components of the image signature system 30 may include a hardware module designed through logic synthesis, a software module executed by at least one core, a processing unit including at least one core and a software module, and a combination thereof. The image signature system 30 may receive firmware transferred to the host 10. As illustrated in FIG. 2, the image signature system 30 may include a key generator 31, a hash circuit 32, a signature generator 33, and a signed image generator 34.

The key generator 31 may generate a key pair including a first private key SKEY_V and a first public key PKEY_y. For example, the key generator 31 may include a random number generator and may generate a key pair based on the random number. In example embodiments, the key generator 31 may be omitted, and the image signature system 30 may receive at least one of key pairs from an external entity.

The hash circuit 32 may receive a firmware image FW and may generate a digest DIG for the firmware image FW. The digest DIG may refer to a hash value generated based on a hash algorithm such as a secure hash algorithm (SHA).

The signature generator 33 may receive a first private key SKEY_V from the key generator 31, and may generate a first signature SIGN_V for the digest DIG based on the first private key SKEY_V. The first signature SIGN_V may be generated based on an arbitrary signature algorithm, for example, from the first private key SKEY_V based on an elliptic curve digital signature algorithm (ECDSA). In example embodiments, as illustrated in FIG. 2, the signature generator 33 may receive a first public key PKEY_V, and may generate the first signature SIGN_V based on the first private key SKEY_V and the first public key PKEY_V.

The signed image generator 34 may receive a firmware image FW and a first signature SIGN y, and may generate a single signed firmware image FW_SS. That is, the single signed firmware image FW_SS may include a firmware image FW and a first signature SIGN_V. In example embodiments, the signed image generator 34 may generate the single signed firmware image FW_SS and the first public key PKEY_V in the form of a digital envelope, and may transfer the generated digital envelope to the host 10.

The method of generating a signature has been described based on the example in which the image signature system 30 generates the first signature SIGN_V for the firmware image FW, but the image signature system 30 may generate a signature for an arbitrary firmware, program, software or data. In the example embodiment, data for which a signature is generated may be referred to as a message MSG.

FIG. 3 is a diagram illustrating a method of verifying a signature according to an example embodiment.

Referring to FIG. 3, the storage controller 21 may receive a message MSG and a signature SIG for the message, and may verify the signature SIG based on a public key (PKEY), thereby determining that the message MSG was created by an authentic person. In example embodiments, the message MSG may be a single signed firmware image or a dual signed firmware image.

The storage controller 21 may include a hash circuit 41, a decryption circuit 42 and a comparator circuit 43. The hash circuit 41 may generate a digest DIG for the message MSG based on the hash algorithm. The decryption circuit 42 may generate a comparison target digest DIG' by decoding the signature SIG based on the public key (PKEY). The comparator circuit 43 may generate validity information VLD by comparing the digest DIG with the comparison target digest DIG'. The validity information VLD may indicate that the message MSG was created by an authentic person.

For example, based on the storage controller 21 authenticating a dual signed firmware image in which a signature of customer is added to (or included in) a single signed firmware image FW_SS, the hash circuit 41 may generate a digest DIG of a single signed firmware image FW_SS. The decryption circuit 42 may generate a comparison target digest DIG' for a signature of customer using the public key of customer PKEY_C. The comparator circuit 43 may compare the digest DIG with the comparison target digest DIG', and may output validity information VLD based on the comparison result. The validity information VLD may indicate that the single signed firmware image FW_SS is firmware transferred by a valid customer.

Based on verifying that the single signed firmware image FW_SS is a firmware image transferred by a valid customer, the storage controller 21 may authenticate a single signed firmware image using a firmware image FW, a first signature SIGN y, and a first public key PKEY_y. The hash circuit 41 may generate a digest DIG of the firmware image FW. The decryption circuit 42 may generate a comparison target digest DIG' by decoding the first signature SIGN_V using the first public key PKEY_y. The comparator circuit 43 may compare the digest DIG with the comparison target digest DIG', and may output validity information VLD based on the comparison result. The validity information VLD may indicate that the firmware image FW is generated by a valid person, that is, a firmware vendor.

Figure 4A:
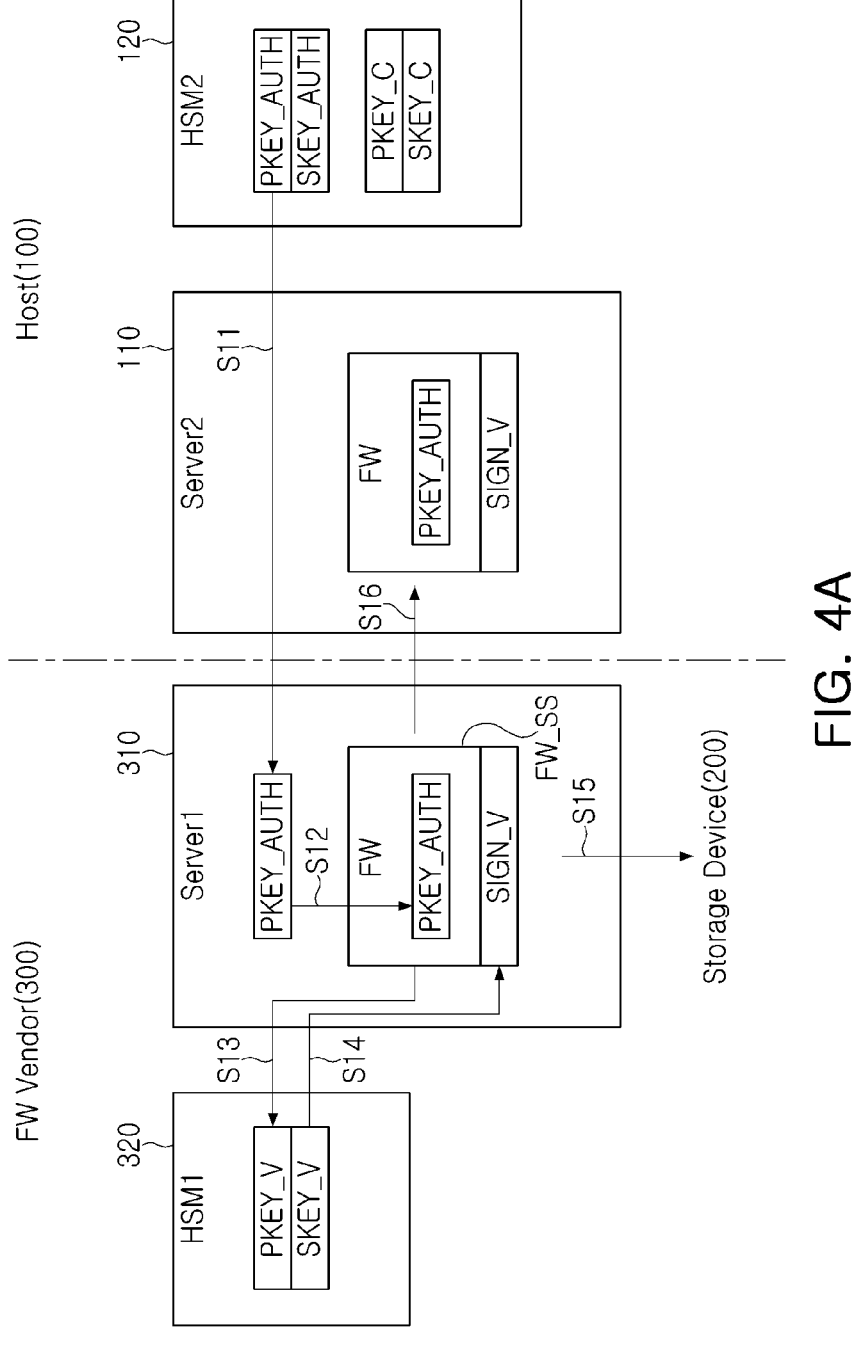
FIGS. 4A and 4B are diagrams illustrating a method of generating a signed firmware image according to an example embodiment of the present disclosure.
Figure 4B:
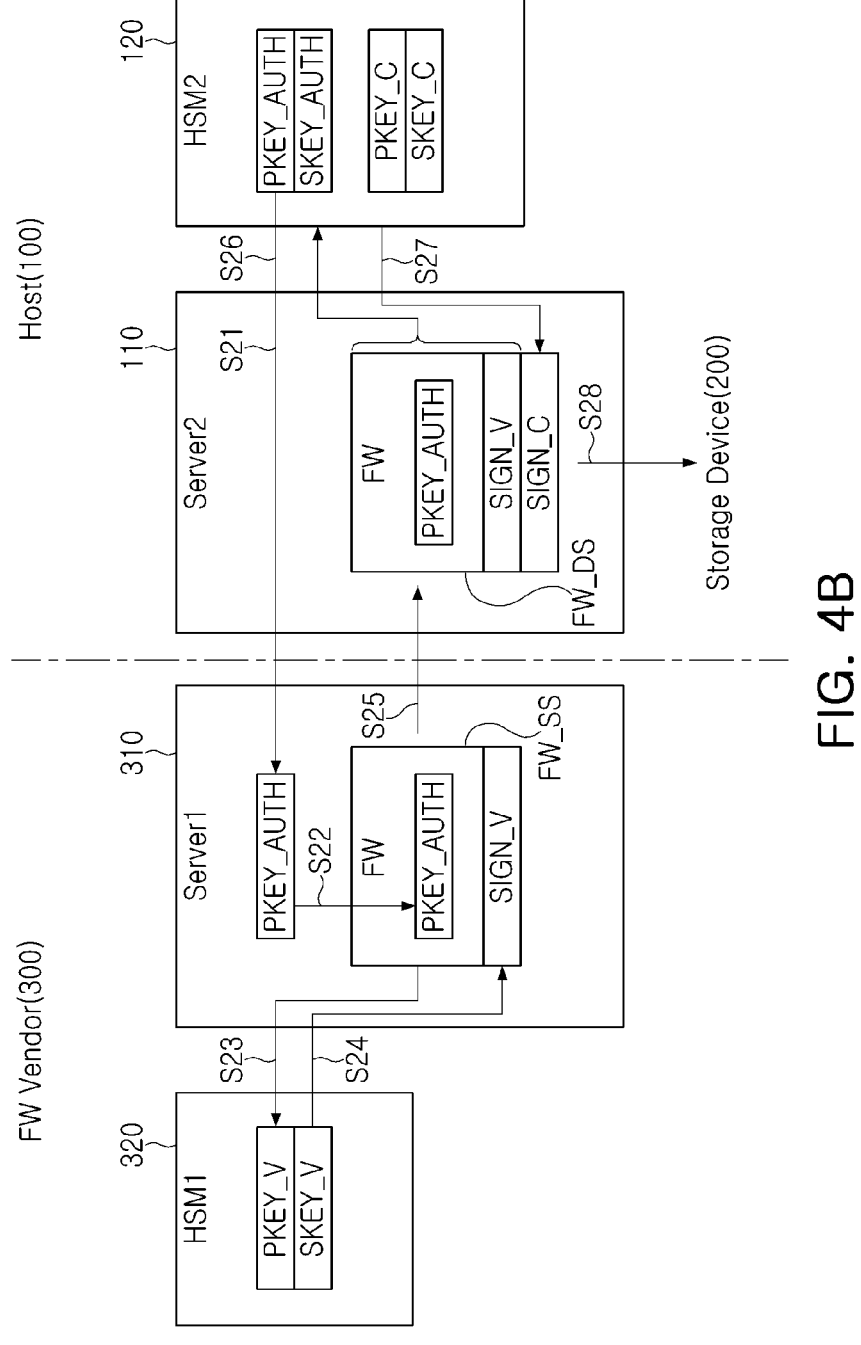

FIGS. 4A and 4B are diagrams illustrating a method of generating a signed firmware image according to an example embodiment. Specifically, FIG. 4A illustrates a method of generating a single signed firmware image, and FIG. 4B illustrates a method of generating a dual signed firmware image.

FIG. 4A illustrates a vendor system 300 and a host 100. The host 100 may correspond to the host 10 described with reference to FIG. 1. The vendor system 300 may include a first server 310 and a first hardware security module (HSM) 320 (HSM1). The host 100 may include a second server 110 and a second HSM 120 (HSM2).

Each of the first server 310 and the second server 110 may include at least one core for processing commands. In example embodiments, the first server 310 and the second server 110 include an application processor, a microprocessor, a central processing unit (CPU), a processor core, a multi-core processor, a multiprocessor, an application-specific integrated circuit (ASIC) and field programmable gate array (FPGA), but an example embodiment thereof is not limited thereto.

The first HSM 320 and the second HSM 120 may generate a key pair including a public key and a private key and may safely store the key pair. For example, the first HSM 320 and the second HSM 120 may include the image signature system 30 described with reference to FIG. 2. The first HSM 320 and the second HSM 120 may receive a message from an external entity, may generate a signature for the message using a private key, and may output the signature. The first HSM 320 and the second HSM 120 may output the public key, but may not leak the private key. The private key may also be referred to as a secret key.

The first HSM 320 may generate a key pair including a first public key PKEY_V and a first private key SKEY_V. Also, the second HSM 120 may generate a key pair including a second public key PKEY_C and a second private key PKEY_C. In an example embodiment, the second HSM 120 may further generate a key pair including a public key PKEY_AUTH for host authentication and a private key SKEY_AUTH for host authentication.

In operation S11, the second server 110 may obtain the public key PKEY_AUTH for host authentication from the second HSM 120 and may transfer the public key PKEY_AUTH for host authentication to the first server 310.

In operation S12, the first server 310 may include the public key PKEY_AUTH for host authentication in the firmware image FW. For example, the first server 310 may allow the public key PKEY_AUTH for host authentication to be included in a firmware image initially stored in the storage device 200, and may also allow the public key PKEY_AUTH for host authentication to be included in a firmware image to be updated. Based on receiving the changed public key for host authentication from the second server 110, the first server 310 may allow the changed public key for host authentication to be included in the firmware image FW.

In operation S13, the first server 310 may provide the firmware image FW to which the public key PKEY_AUTH for host authentication is added to (or included in) the first HSM 320. The first HSM 320 may generate a first signature SIGN_V for the firmware image FW using the first private key SKEY_V, and may output the first signature SIGN_V in operation S14.

The first server 310 may generate a single signed firmware image FW_SS by adding a first signature SIGN_V to the firmware image FW. In operation S15, the first server 310 may directly store the single signed firmware image FW_SS in the storage device 200. In operation S16, the first server 310 may support the second server 110 to update the firmware of the storage device 200 by providing the single signed firmware image FW_SS to the second server 110. Operation S15 and operation S16 may be selectively performed.

The vendor system 300 and the host 100 in FIG. 4B may correspond to the vendor system 300 and the host 100 illustrated in FIG. 4A.

Referring to FIG. 4B, the vendor system 300 and the host 100 may generate a dual signed firmware image FW_DS by performing operation S21 to operation S28, and may provide the dual signed firmware image FW_DS to the storage device 200. Operations S21 to operation S24 may be the same as operations S11 and operation S14 in FIG. 4A, respectively.

In operation S25, the first server 310 may provide the single signed firmware image FW_SS to the second server 110. The second server 110 may perform a security audit on the single signed firmware image FW_SS. Based on the security audit being completed, the second server 110 may provide the single signed firmware image FW_SS to the second HSM 120 in operation S26. The second HSM 120 may generate the second signature SIGN_C for the single signed firmware image FW_SS using the second private key SKEY_C, and may output the first signature SIGN_V in operation S27.

The second server 110 may generate a dual signed firmware image FW_DS by adding the second signature SIGN_C to the single signed firmware image FW_SS. The second server 110 may provide the dual signed firmware image FW_DS to the storage device 200 and may request the storage device 200 to update the firmware in operation S28.

In FIG. 4B, an example embodiment has been described based on the example in which the second server 110 adds the second signature SIGN_C to the entire single signed firmware image FW_SS, but an example embodiment thereof is not limited thereto. For example, the second server

110 may obtain the second signature SIGN_C for the firmware image FW by providing only the firmware image FW to the second HSM 120, and may add the second signature SIGN_C to the single signed firmware image FW_SS.

The second server 110 may transfer the second public key PKEY_C to the storage device 200 using a command to which a signature for host authentication is added. Specifically, the second server 110 may obtain the second public key PKEY_C from the second HSM 120, and may request the second HSM 120 to generate a signature for host authentication for the second public key PKEY_C using the private key SKEY_AUTH for host authentication. The second server 110 may obtain a signature for host authentication from the second HSM 120 and may provide a command including the signature for host authentication and the second public key PKEY_C to the storage device 200.

The storage device 200 may verify whether the command is transferred from a valid customer using the public key PKEY_AUTH for host authentication included in the firmware image FW, and may store the second public key PKEY_C according to the verification result.

Attackers may attempt to change the storage device 200 such that the storage device 200 may execute the firmware when only a single signature is verified from the firmware image even after the storage device 200 stores the second public key PKEY_C.

In an example embodiment, the storage device 200 may change the signature verification state to verify both the supplier signature and the customer signature in the firmware image when the second public key PKEY_C is stored for the first time. Based on the dual signed firmware image authenticated using the second public key PKEY_C being executed for the first time, the storage device 200 may change the signature verification state such that the single signed firmware image may not be executed. The storage device 200 may protect the signature verification state of the storage device 200 from being changed by attackers by storing the changed signature verification state in the OTP memory. Accordingly, security of the storage device 200 may be improved.

Hereinafter, a storage controller, a storage device, and a method of operating the same according to an example embodiment will be described in greater detail with reference to FIGS. 5 to 12.

Figure 5:
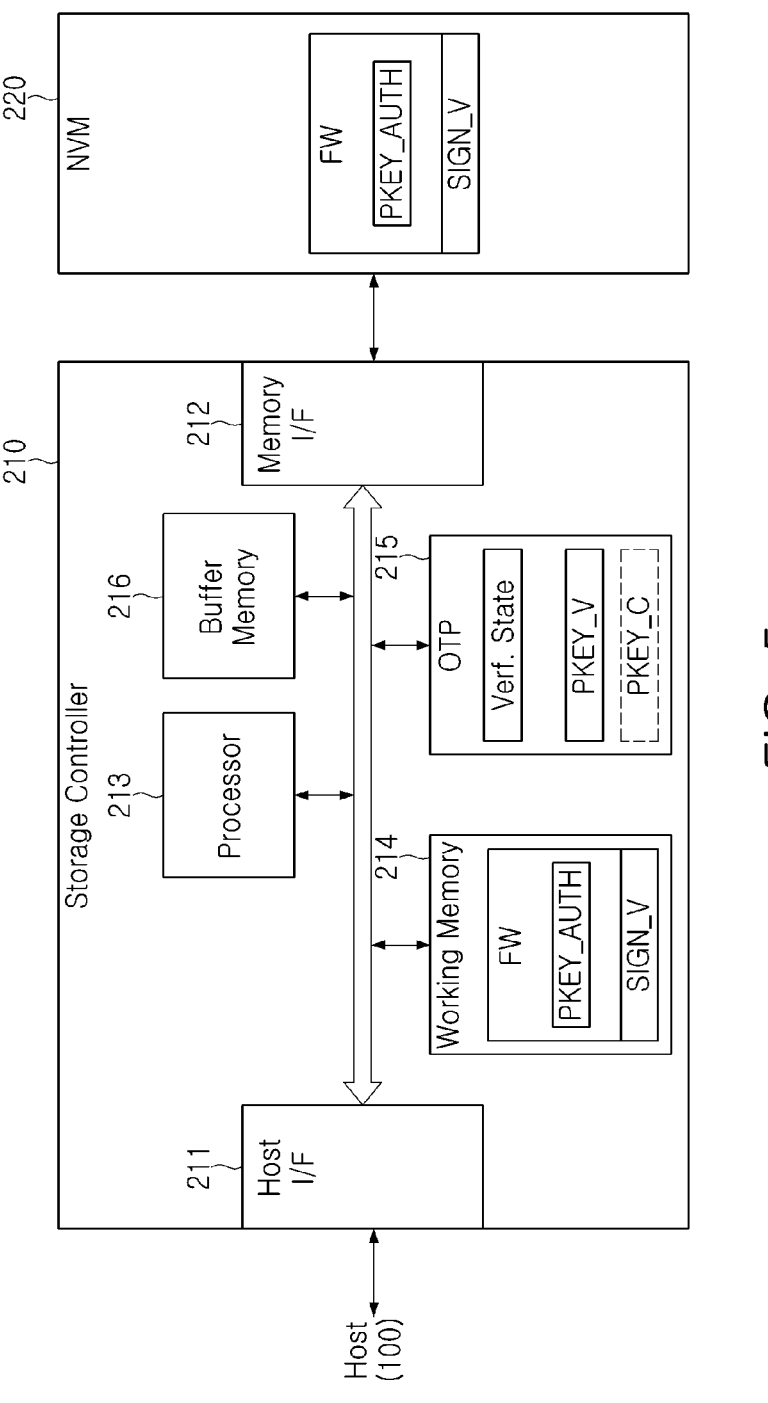
FIG. 5 is a diagram illustrating a storage device according to an example embodiment of the present disclosure.

FIG. 5 is a diagram illustrating a storage device according to an example embodiment.

A storage device 200 may include a storage controller 210 and a non-volatile memory 220 (shown as NVM 220). The storage device 200, the storage controller 210, and the nonvolatile memory 220 in FIG. 5 may correspond to the storage device 20, the storage controller 21, and the nonvolatile memory 22 described with reference to FIG. 1, respectively.

The storage controller 210 may include a host interface 211, a memory interface 212, a processor 213, a working memory 214, an OTP memory 215, and a buffer memory 216.

The host interface 211 may transmit a packet to and may receive a packet from the host 100. A packet transferred from the host 100 to the host interface 211 may include a command, data to be written to the nonvolatile memory 220, or data to be written to a storage space (e.g., the OTP memory 215) in the storage controller 210, and a packet transferred from the host interface 211 to the host 100 may include a response to a command or data read from the nonvolatile memory 220.

The memory interface 212 may transfer data to be written in the non-volatile memory 220 to the nonvolatile memory 220 or may receive data read from the non-volatile memory 220. The memory interface 212 may be implemented to comply with standard protocols such as Toggle or ONFI.

The processor 213 may further include a hardware accelerator designed to perform a predefined operation at high speed, and an input/output (I/O) interface providing a communication channel with external components of the processor 213. In example embodiments, the components of the processor 213 may be integrated on a single chip or a single die, and the processor 213 may be referred to as a system-on-chip (SoC). In an example embodiment, the components of the processor 213 may be integrated into two or more chips included in a package, and the processor 213 may be referred to as a system-in-package (SiP). The processor 213 may also be referred to as a micro-control unit (MCU).

The working memory 214 may temporarily store data used by the processor 213. For example, at least a portion of the instructions included in the firmware image FW stored in the nonvolatile memory 220 may be copied to the working memory 214, and the processor 213 may execute the copied instructions. In an example embodiment, the working memory 214 may include a volatile memory, such as a volatile memory providing a relatively high operating speed, such as a static random access memory (SRAM).

The OTP memory 215 may store unique data of the storage controller 210 in a non-volatile manner. For example, the OTP memory 215 may store a first public key PKEY_V and a second public key PKEY_C used to authenticate a firmware image. In an example embodiment, the OTP memory 215 may further store a signature verification state value of the storage controller 210.

The buffer memory 216 may temporarily store data to be stored in the nonvolatile memory 220 or data output from the nonvolatile memory 220. For example, the buffer memory 216 may temporarily store a firmware image downloaded from the host 100 or a firmware image loaded from the nonvolatile memory 220. In an example embodiment, the buffer memory 216 may include a volatile memory such as dynamic random access memory (DRAM).

As described above, the storage device 200 may change the signature verification state based on the second public key PKEY_C being first stored in the OTP memory 215 and based on the dual signed firmware image being first executed, and the storage device 200 may store the state value in the OTP memory 215, such that protection from returning to the previous signature verification state may be implemented.

Figures 6A, 6B:
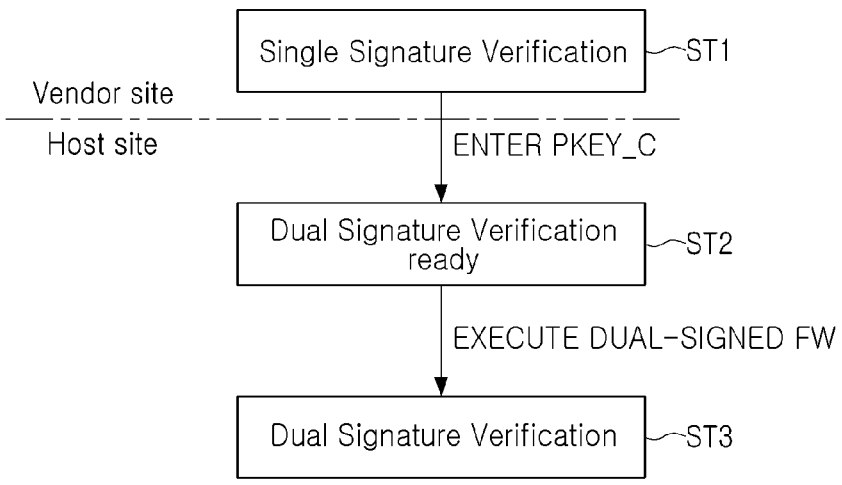
FIG. 6A is a table illustrating a signature verification state according to an example embodiment of the present disclosure.
FIG. 6B is a diagram illustrating a signature verification state according to an example embodiment of the present disclosure.

FIG. 6A is a table illustrating a signature verification state according to an example embodiment of the present disclosure. FIG. 6B is a diagram illustrating a signature verification state according to an example embodiment of the present disclosure. FIG. 6A is a diagram illustrating a plurality of states of a storage controller, and FIG. 6B illustrates a finite state machine of the storage controller.

Referring to FIGS. 6A and 6B together, a first state ST1 of the storage controller may be a single signature verification state, a second state ST2 may be a dual signature verification ready state, and a third state ST3 may be a dual signature verification state.

A storage device may have a single signature state ST1 when manufactured (or prior to being implemented). In the single signature state ST1, the storage device may verify only the first signature SIGN_V added to (or included in) the firmware image to authenticate the firmware image. Also, the storage device may allow execution of a single signed firmware image (i.e., a firmware image to which only the first signature SIGN_V is added).

The storage device may not prohibit updating or executing a dual signed firmware image in the single signature state ST1. For example, based on the storage device receiving a dual signed firmware image from the host in the single signature state, the storage device may complete the authentication of the dual signed firmware image based on only the first signature SIGN_V of the first signature SIGN_V and the second signature SIGN_C included in the dual signed firmware image being verified, and the storage device may update or execute the firmware image.

The storage device may maintain a single signature state ST1 until the storage device is shipped by a manufacturer of the storage device and transferred to a host. In an example embodiment, the customer may enter the second public key PKEY_C into the storage device by providing a command including the second public key PKEY_C and a signature for host authentication to the storage device.

The storage device in the single signature verification state ST1 may change the signature verification state from the single signature verification state ST1 to the dual signature verification ready state ST2 based on the second public key PKEY_C being successfully entered. In the dual signature verification ready state ST2, the storage device may verify both the first signature SIGN_V and the second signature SIGN_C added to (or included in) the firmware image to authenticate the firmware image.

The storage device may not prohibit updating or executing a single signed firmware image in the dual signature verification ready state ST2. For example, even after the storage device stores the second public key PKEY_C, the existing single signed firmware image may be allowed to be executed until the dual signed firmware image is updated and executed, and the updating of the single signed firmware image may also be allowed. However, when the storage device fails to verify the second signature SIGN_C of the dual signed firmware image, the storage device may prohibit updating or executing the dual signed firmware image.

The storage device may change the signature verification state from the dual signature verification ready state ST2 to the dual signature verification state ST3 when updating of the dual signed firmware image is completed and the firmware image update is executed. In the dual signature verification state ST3, the storage device may verify both the first signature SIGN_V and the second signature SIGN_C added to (or included in) the firmware image to authenticate the firmware image.

The storage device may prohibit execution of a single signed firmware image in the dual signature verification state ST3. The storage device may not return to the dual signature verification ready state ST2 or the single signature verification state ST1 from the dual signature verification state ST3. Accordingly, the storage device may prohibit execution of a single signed firmware image not including the signature of the valid customer once the dual signed firmware image obtained from the valid customer is executed. Accordingly, security of the storage device may be improved.

Figure 7B:
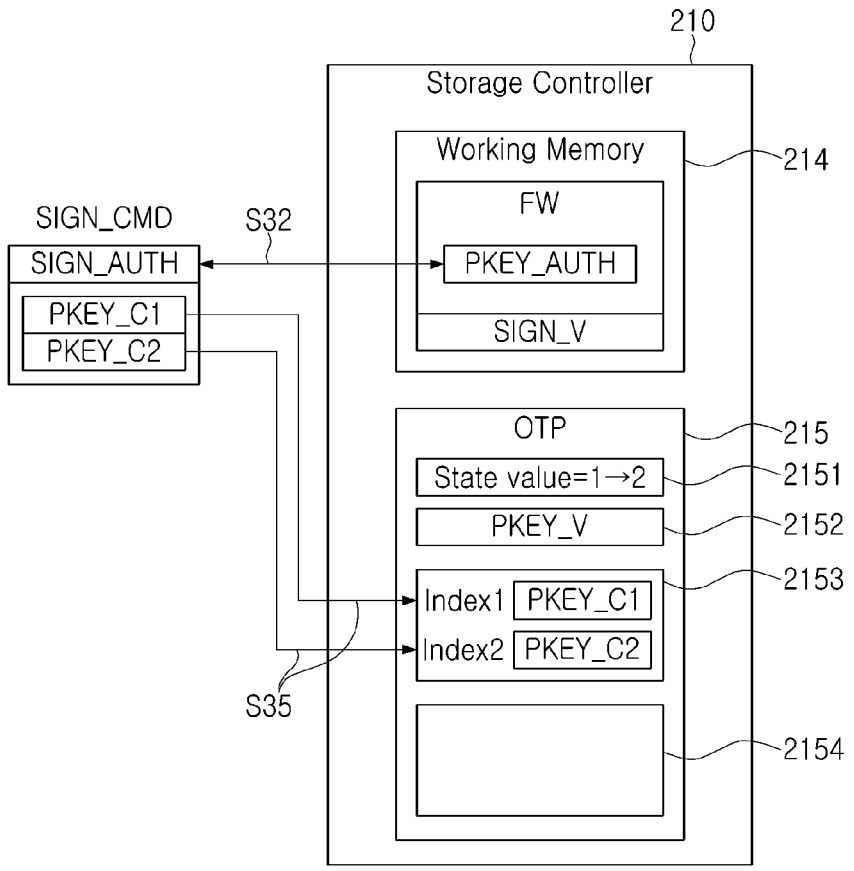
FIG. 7B is a diagram illustrating a method of entering a second public key of a storage device according to an example embodiment of the present disclosure.

FIG. 7A is a flowchart illustrating a method of entering a second public key of a storage device according to an example embodiment of the present disclosure. FIG. 7B is a diagram illustrating a method of entering a second public key of a storage device according to an example embodiment of the present disclosure.

Referring to FIG. 7A, in operation S31, the storage controller 210 may receive a storage command SAVE_CMD including a second public key PKEY_C and a signature SIGN_AUTH for host authentication from the host. The signature SIGN_AUTH for host authentication may be a signature for the second public key PKEY_C, which may be generated using a private key SKEY_AUTH for host authentication corresponding to the public key PKEY_AUTH for host authentication included in the firmware image executed in the storage controller 210.

The storage controller 210 may verify the signature SIGN_AUTH for host authentication with the public key PKEY_AUTH for host authentication included in the firmware image executed in operation S32, and may determine whether the public key PKEY_AUTH for host authentication is verified successfully in operation S33.

Based on the verification of the signature SIGN_AUTH for host authentication failing ("No" in operation S33), the storage controller 210 may provide an error message to the host 100 in operation S34. For example, the error message may be provided as a response to the command.

Based on verification of the signature for host authentication being successful ("Yes" in operation S33), the storage controller 210 may store the second public key PKEY_C included in the command in the OTP memory 215 in operation S35.

In operation S36, the storage controller 210 may determine whether the current signature verification state is a single signature state (e.g., ST1 of FIG. 6B). In the case in which the current signature verification state is a single signature state ("Yes" in operation S36), the storage controller 210 may switch the single signature state to a dual signature ready state (e.g., ST2 of FIG. 6B) in operation S37. In the case in which the current signature verification state is not a single signature state ("No" in operation S36), the storage controller 210 may complete the entering of the second public key PKEY_C.

FIG. 7B illustrates a working memory 214 and an OTP memory 215 included in the storage controller 210 described with reference to FIG. 5.

The working memory 214 may load at least a portion of the firmware image executed by the storage controller 210. The firmware image loaded into the working memory 214 may include a public key PKEY_AUTH for host authentication.

The OTP memory 215 may include a state value area 2151, a first public key area 2152, a second public key area 2153, and a discarded public key area 2154. The state value area 2151 may store the state value of the storage device 200 described with reference to FIGS. 6A and 6B. The first public key area 2152 may store a first public key PKEY_V for verifying the first signature of the firmware image. The first public key PKEY_y may be stored when the storage device 200 is manufactured or at a time prior to being implemented. The second public key area 2153 may store one or more second public keys PKEY_C1 and PKEY_C2 entered from the host. The second public key area 2153 may further store indexes Index1 and Index2 of each second public key. The discarded public key area 2154 may indicate discarded public keys among the second public keys stored in the second public key area 2153.

The storage command SAVE_CMD provided from the host may include one or more second public keys PKEY_C1 and PKEY_C2 and a signature SIGN_AUTH for host authentication for one or more customer public keys. The storage command SAVE_CMD may further include information on the number of second public keys to be stored.

As described in FIG. 7A, the signature SIGN_AUTH for host authentication may be verified using the public key PKEY_AUTH for host authentication in operation S32. Based on verification of the storage command SAVE_CMD being completed through signature verification, in operation S35, the storage controller 210 may store one or more second public keys PKEY_C1 and PKEY_C2 stored in the storage command SAVE_CMD in the second public key area 2153 of the OTP memory 215. Based on the state value stored in the state value area 2151 indicating a single signature verification state (e.g., ST1 of FIG. 6B), the storage controller 210 may change the state value to a dual signature verification ready state (e.g., ST2 of FIG. 6B).

FIG. 7B illustrates the example in which the storage controller 210 stores the second public key PKEY_C1 and PKEY_C2 in plain text in the OTP memory 215, but an example embodiment thereof is not limited thereto. For example, the storage controller 210 may generate one or more digests by performing a hash operation on each of one or more second public keys PKEY_C1 and PKEY_C2, and may store the one or more digests in the OTP memory 215. When the storage controller 210 stores the digest of the second public key instead of the second public key PKEY_C1 and PKEY_C2, the storage capacity of the OTP memory 215 may be saved. A method of verifying the second signature of the dual signature firmware image when the storage controller 210 stores the digest of the second public key will be described later with reference to FIG. 9C.

In an example embodiment, the storage controller 210 may store only the second public key PKEY_C received from a valid customer in the OTP memory 215 by authenticating the second public key PKEY_C using the public key PKEY_AUTH for host authentication included in the firmware image generated by a valid vendor. Accordingly, the storage controller 210 may prevent attackers from entering their own public key and may thus prevent execution of a firmware image changed by attackers.

The storage controller 210 may further provide a method of discarding the second public key PKEY_C stored in the OTP memory 215.

Figure 8A:
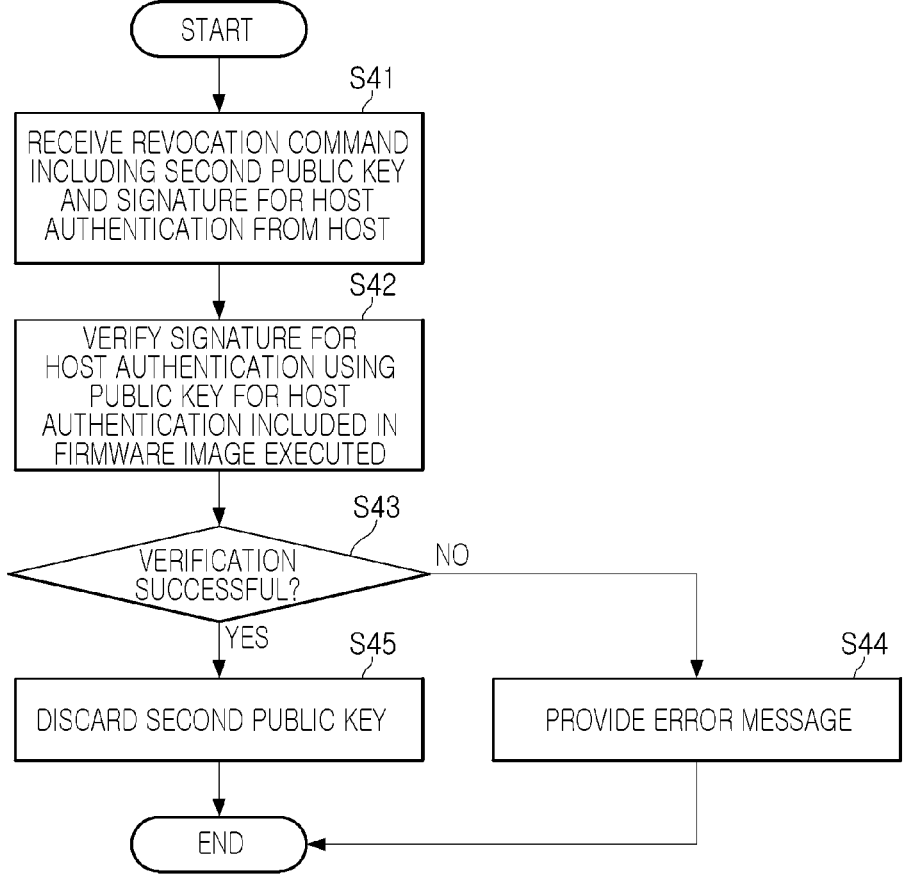
FIG. 8A is a flowchart illustrating a method of deleting a second public key of a storage device according to an example embodiment of the present disclosure.
Figure 8B:
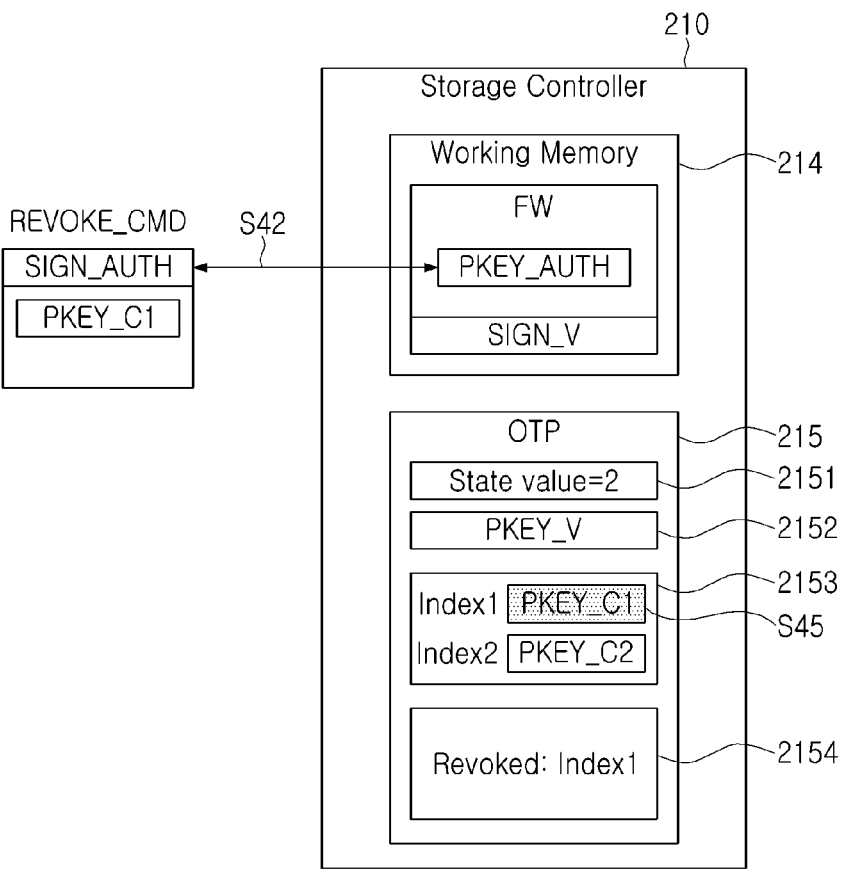
FIG. 8B is a diagram illustrating a method of deleting a second public key of a storage device according to an example embodiment of the present disclosure.

FIG. 8A is a flowchart illustrating a method of deleting a second public key of a storage device according to an example embodiment of the present disclosure. FIG. 8B is a diagram illustrating a method of deleting a second public key of a storage device according to an example embodiment of the present disclosure.

Referring to FIG. 8A, the storage controller 210 may receive a revocation command REVOKE_CMD including a second public key PKEY_C to be discarded and a signature SIGN_AUTH for host authentication from the host in operation S41.

The storage controller 210 may verify the signature SIGN_AUTH for host authentication using the public key PKEY_AUTH for host authentication included in the firmware image executed in operation S42, and may determine whether the verification is successful in operation S43.

Based on the verification of the signature SIGN_AUTH for host authentication failing ("No" in operation S43), the storage controller 210 may provide an error message to the host 100 in operation S44. For example, the error message may be provided as a response to the revocation command REVOKE_CMD.

Based on signature SIGN_AUTH for host authentication verification being successful ("Yes" in operation S43), the storage controller 210 may discard the second public key PKEY_C included in the revocation command in operation S45.

FIG. 8B illustrates a working memory 214 and an OTP memory 215 included in the storage controller 210. The working memory 214 and the OTP memory 215 may correspond to the examples described with reference to FIG. 7B.

The revocation command REVOKE_CMD provided by the host may include a second public key PKEY_C to be discarded, and a signature SIGN_AUTH for host authentication for the second public key PKEY_C to be discarded.

As described in FIG. 8A, in operation S42, the signature SIGN_AUTH for host authentication included in the revocation command REVOKE_CMD may be verified using the public key PKEY_AUTH for host authentication.

Based on verification of the revocation command REVOKE_CMD being completed through signature verification, in operation S45, the storage controller 210 may discard the second public key PKEY_C1 included in the revocation command REVOKE_CMD among the second public keys PKEY_C1 and PKEY_C2 stored in the second public key area 2153 of the OTP memory 215.

The storage controller 210 may indicate that the second public key PKEY_C1 has been discarded by recording an identifier of the second public key PKEY_C to be discarded (e.g., an index value) in the discarded public key area 2154 of the OTP memory 215. The storage controller 210 may maintain the second public key PKEY_C1 stored in the second public key area 2153, and may physically discard the second public key PKEY_C1 by overwriting the entirety of bit values of the area in which the second public key PKEY_C1 is stored with a dummy value such as "1."

In an example embodiment, the storage controller 210 may prevent attackers from arbitrarily discarding the second public key PKEY_C by executing only the authenticated revocation command REVOKE_CMD using the public key PKEY_AUTH for host authentication.

Figure 11:
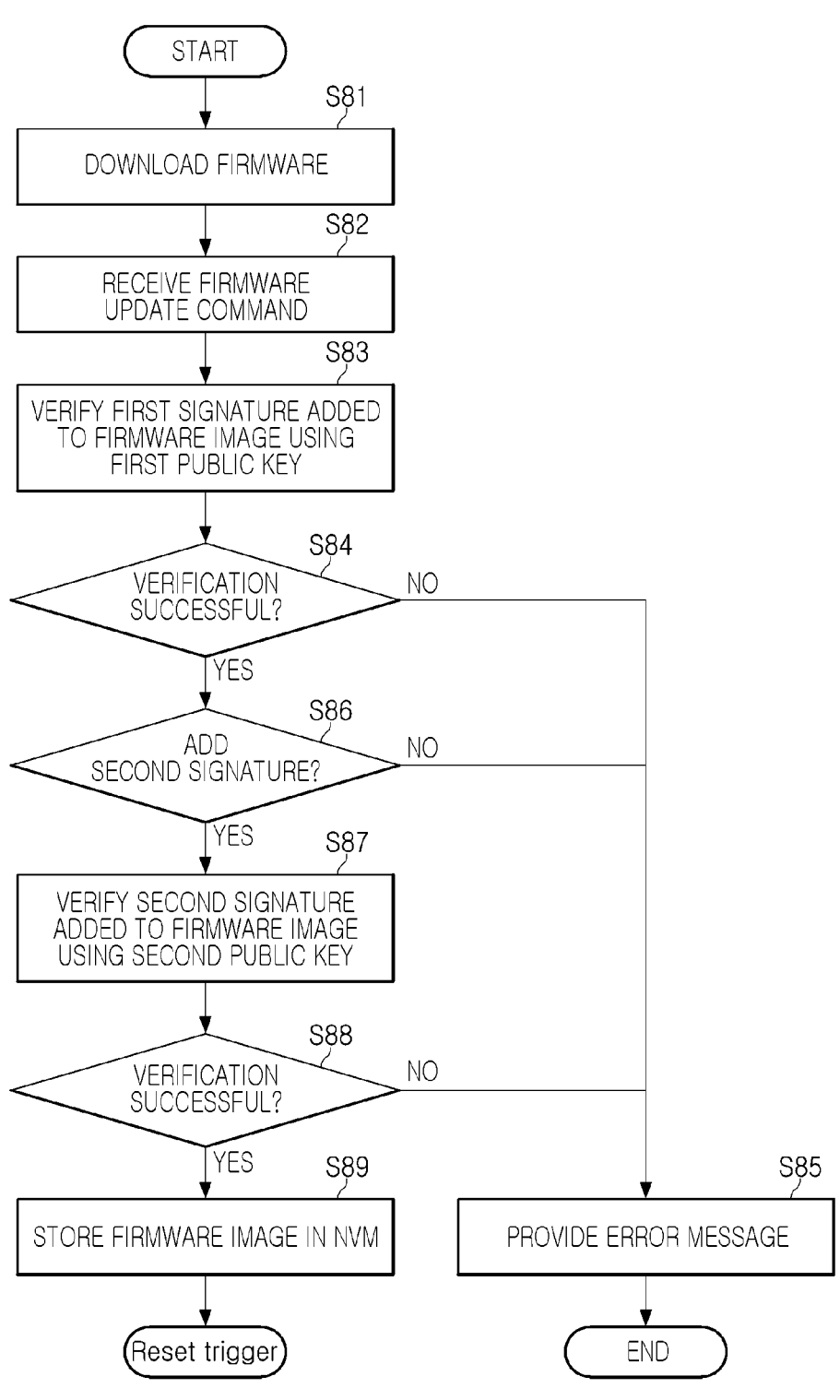
FIG. 11 is a flowchart illustrating a method of updating firmware of a storage device in a dual signature verification state according to an example embodiment of the present disclosure.
Figure 12:
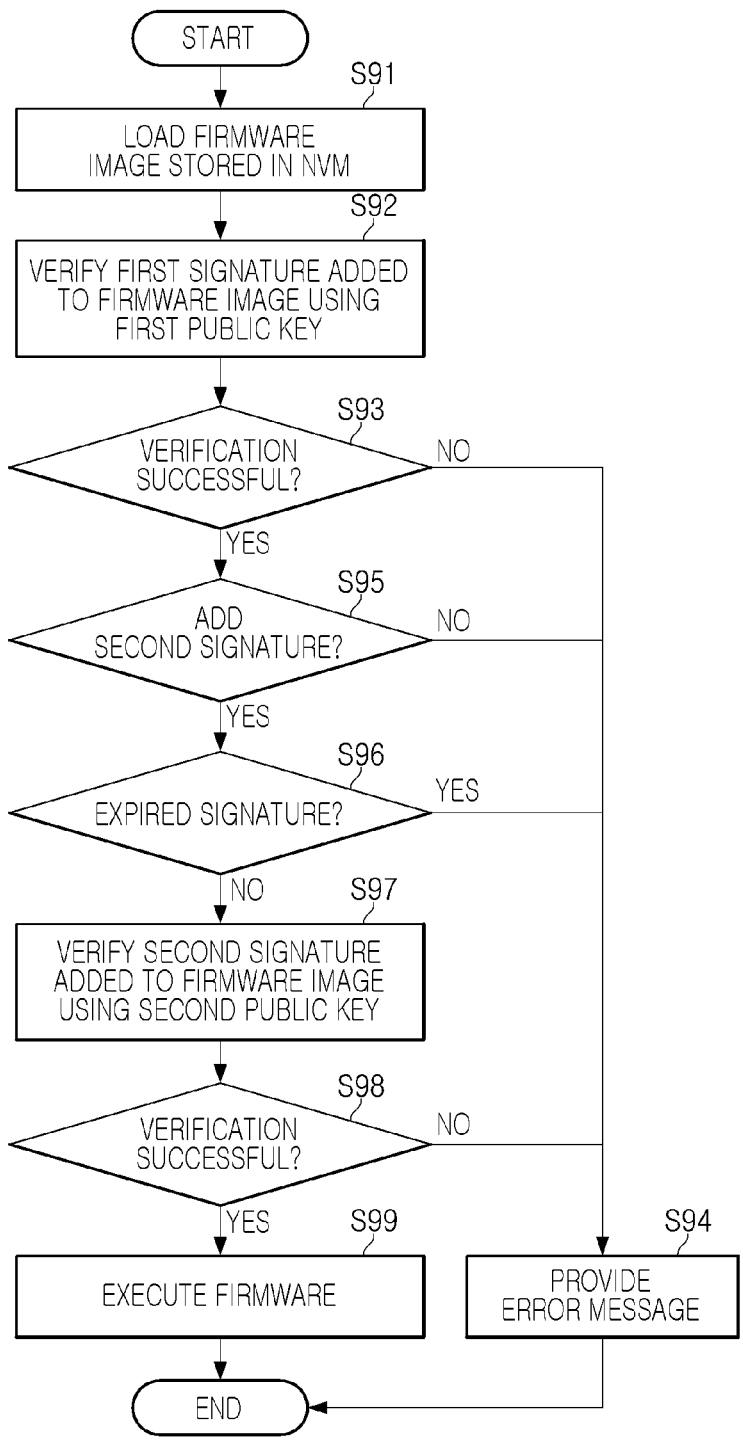
FIG. 12 is a flowchart illustrating a method of executing firmware of a storage device in a dual signature verification state according to an example embodiment of the present disclosure.

The storage controller 210 may authenticate the dual signed firmware image using the second public key PKEY_C entered in response to the storage command SAVE_CMD from the host, and may update or execute the firmware only when the firmware image is authenticated. Hereinafter, a method of updating firmware and a method of executing firmware according to an example embodiment will be described with reference to FIGS. 9A to 12. Specifically, FIGS. 9A to 10B describe a method of updating firmware and a method of executing firmware when the storage device is in a dual signature verification ready state (e.g., ST2 of FIG. 6B), and FIGS. 11 and 12 illustrate a method of updating firmware and a method of executing firmware when the storage device is in a dual signature verification state (e.g., ST3 of FIG. 6B).

Figure 9A:
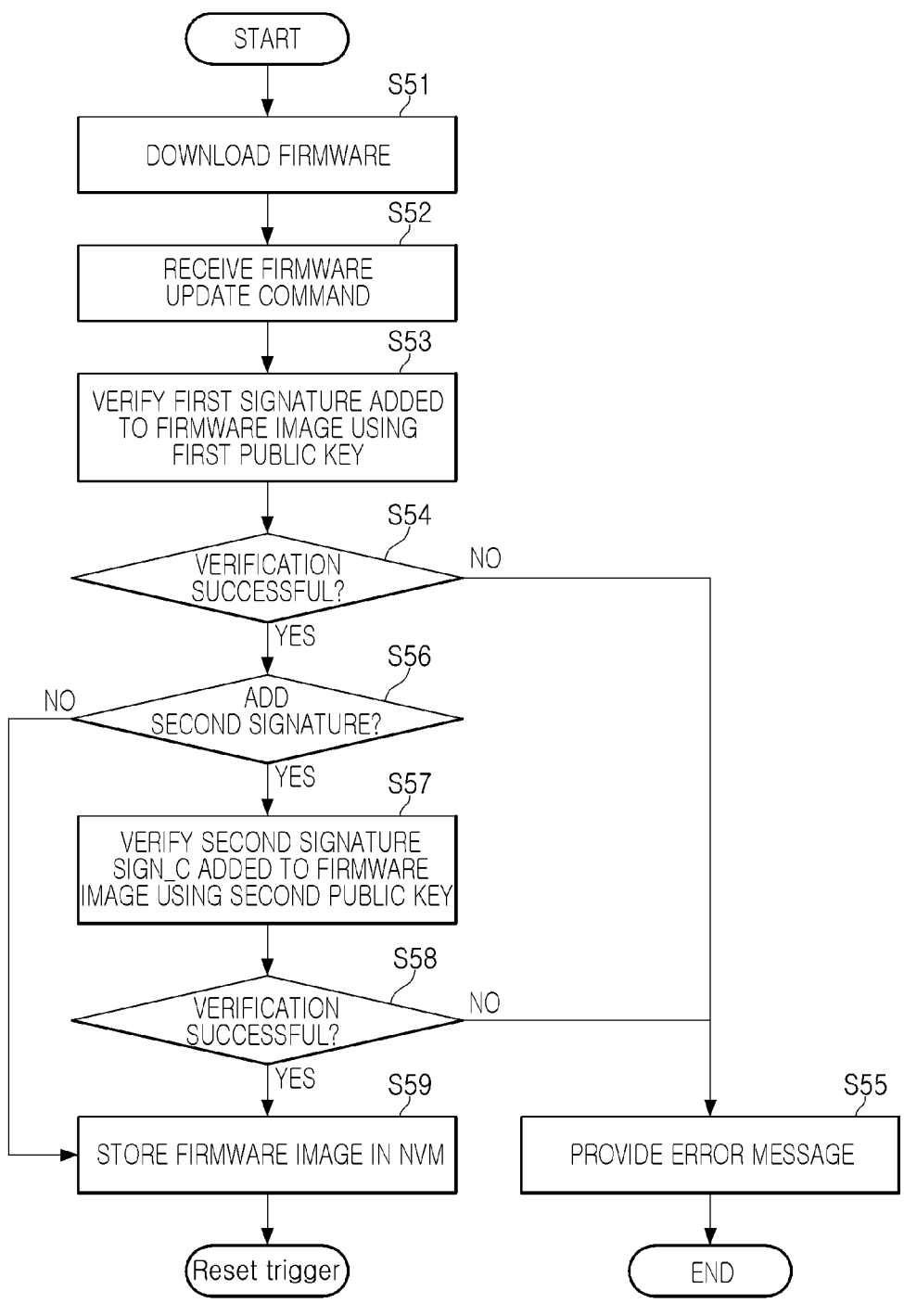
FIG. 9A is a flowchart illustrating a method of updating firmware of a storage device in a dual signature verification ready state according to an example embodiment of the present disclosure.
Figure 9B:
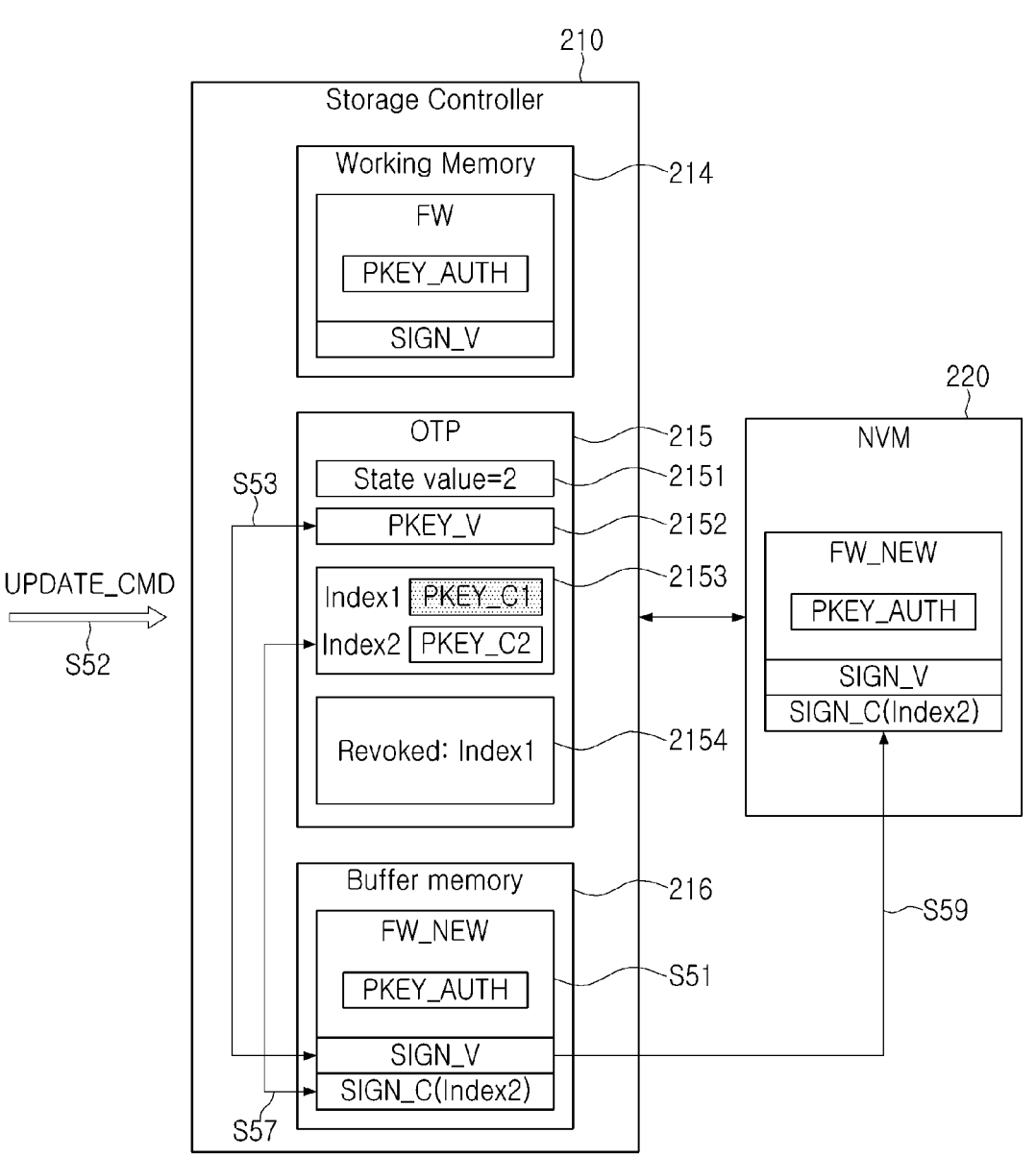
FIGS. 9B and 9C are diagrams illustrating a method of updating firmware of a storage device in a dual signature verification ready state according to an example embodiment of the present disclosure.
Figure 9C:
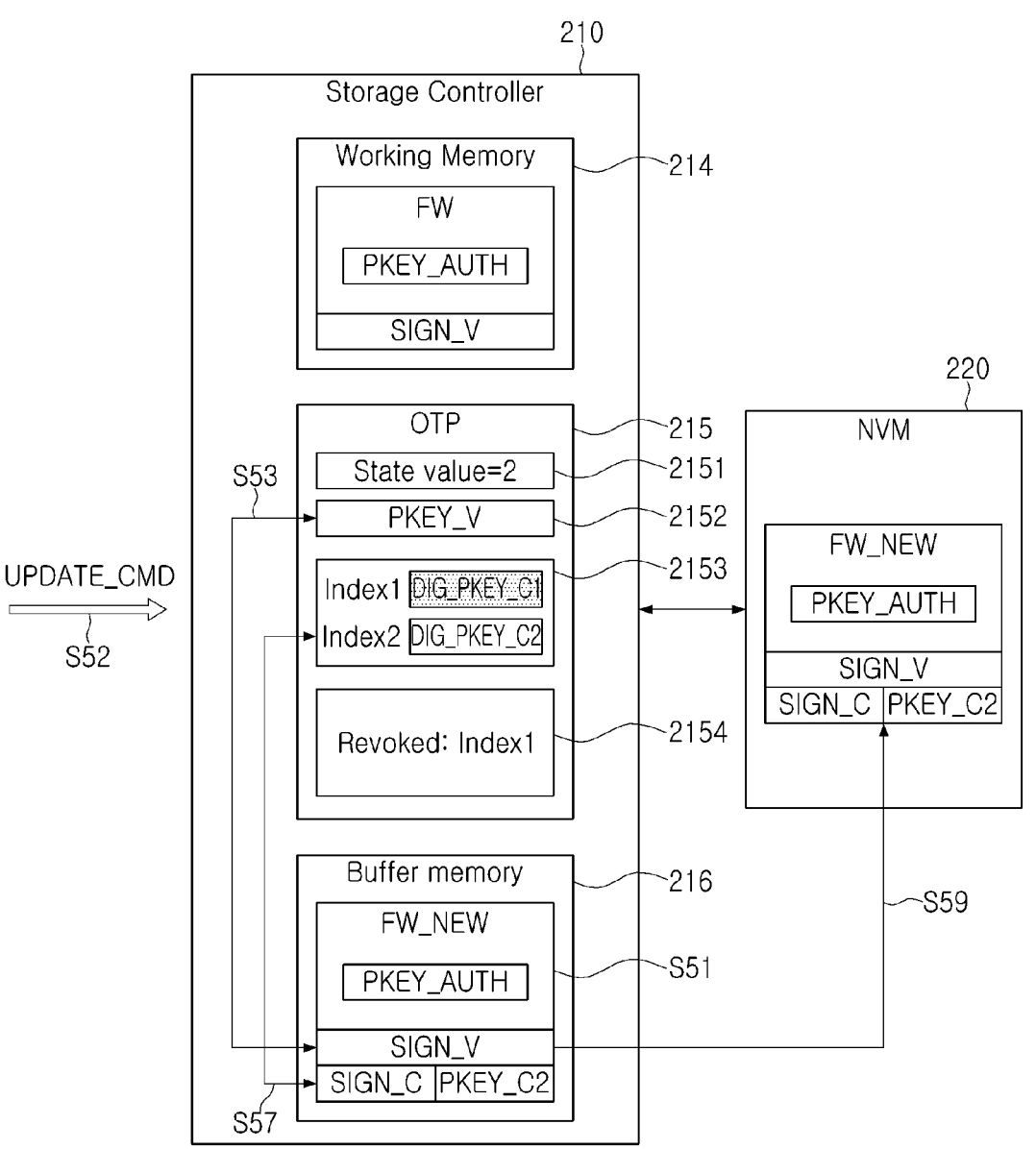

FIG. 9A is a flowchart illustrating a method of updating firmware of a storage device in a dual signature verification ready state according to an example embodiment of the present disclosure. FIGS. 9B and 9C are diagrams illustrating a method of updating firmware of a storage device in a dual signature verification ready state according to an example embodiment of the present disclosure.

Referring to FIG. 9A, the storage controller 210 may download firmware from the host 100 in operation S51. For example, the host 100 may provide a firmware download command including a single signed firmware image or a dual signed firmware image to the storage controller 210. The storage controller 210 may buffer the firmware image included in the firmware download command in the buffer memory 216.

In operation S52, the storage controller 210 may receive a firmware update command from the host 100. The firmware update command may also be referred to as a firmware commit command.

The storage controller 210 may verify the first signature SIGN_V added to the firmware image loaded in the buffer memory 216 in operation S53 using the first public key PKEY_V, and may determine whether the verification is successful in operation S54.

Based on the verification of the first signature SIGN_V failing ("No" in operation S54), the storage controller 210 may provide an error message to the host 100 in operation S55. For example, an error message may be provided as a response to a firmware update command.

Based on the verification of the first signature SIGN_V being successful ("Yes" in operation S54), the storage controller 210 may determine whether the second signature is added to (or included in) the firmware image in operation S56.

When the second signature is not added to (or not included in) the firmware image ("No" in operation S56), the firmware image may be a single signed firmware image. In the operation of dual signature verification preparation, the storage controller 210 may complete authentication of a single signed firmware image which successfully verifies the first signature SIGN_V, and may perform operation S59. In operation S59, the storage controller 210 may complete the firmware update by storing the firmware image loaded in the buffer memory 216 in the nonvolatile memory 220. Also, the storage controller 210 may trigger reset of the storage device 200.

Based on the second signature being added to (or included in) the firmware image ("Yes" in operation S56), the storage controller 210 may verify the second signature SIGN_C added to (or included in) the firmware using the second public key PKEY_C in operation S57 and may determine whether the verification succeeds in operation S58. The second public key PKEY_C may be a public key stored in the OTP memory 215 in response to the storage command SAVE_CMD described with reference to FIG. 7A, and may be a public key obtained from a valid customer.

Based on verification of the second signature failing ("No" in operation S58), the storage controller 210 may perform operation S55. That is, in the dual signature verification ready state (e.g., ST2 of FIG. 6B), the storage controller 210 may allow a firmware update based on a firmware image not including the second signature, but may prohibit a firmware update based on a firmware image including an incorrect second signature.

In the case in which the verification of the second signature is successful ("Yes" in operation S58), the storage controller 210 may complete authentication of the firmware image and may perform operation S59.

FIG. 9B illustrates the storage controller 210 and the nonvolatile memory 220 as described with reference to FIG. 5. The working memory 214, the OTP memory 215, and the buffer memory 216 illustrated in FIG. 9B may correspond to the examples described with reference to FIG. 5.

The firmware image FW in the working memory 214 may indicate an image of firmware currently being executed in the storage controller 210. The storage controller 210 may perform firmware download and firmware update by executing firmware corresponding to the firmware image FW.

As described with reference to FIG. 9A, in operation S51, the buffer memory 216 may buffer the update firmware image FW_NEW received from the host 100 in response to the firmware download command. The storage controller 210 may receive the firmware update command UPDATE_CMD in operation S52, and may verify a first signature SIGN_V added to (or included in) the update firmware image FW_NEW in operation S53 using the first public key PKEY_y stored in the OTP memory 215.

Based on the second signature SIGN_C being further added to (or included in) the update firmware image FW_NEW, the storage controller 210 may verify the second signature SIGN_C using the corresponding first public key PKEY_C2 in operation S57. The second signature SIGN_C may further include an identifier such as an index Index2 to indicate to which second public key the second signature SIGN_C corresponds. Based on verification of the second signature SIGN_C being completed, the storage controller 210 may store the update firmware image FW_NEW, the first signature SIGN_V, and the second signature SIGN_C in the nonvolatile memory 220.

As described with reference to FIG. 7B, the storage controller 210 may store a digest of the second public key instead of storing the second public key in plain text in the OTP memory 215. Since the digest of the second public key may be obtained using a hash function, it may be difficult to restore the second public key using the digest. FIG. 9C illustrates a method of authenticating a second signature added to (or included in) a firmware image by the storage controller 210 when a digest of a second public key is stored in the OTP memory 215.

The storage controller 210 and the nonvolatile memory 220 illustrated in FIG. 9c may correspond to the examples described with reference to FIG. 9b. Hereinafter, the example in FIG. 9C will be described focusing on the differences from the example in FIG. 9B.

Referring to FIG. 9C, the second public key area 2153 of the OTP memory 215 may store a digest DIG_PKEY_C2 of the second public key. The buffer memory 216 may buffer an update firmware image FW_NEW to which a first signature SIGN_V, a second signature SIGNS, and a second public key PKEY_C2 for verifying the second signature SIGN_C are added.

The storage controller 210 may generate a digest of the second public key PKEY_C2 added to (or included in) the update firmware image FW_NEW, and may compare the generated digest with the digest stored in the OTP memory 215, thereby determining whether the second public key PKEY_C2 is a public key added by a valid customer.

Based on the second public key PKEY_C2 being a public key added from a valid customer, the storage controller 210 may authenticate the update firmware image FW_NEW by verifying the second signature SIGN_C with the second public key PKEY_C2. Based on authentication of the update firmware image FW_NEW being completed, the storage controller 210 may store the update firmware image FW_NEW in the nonvolatile memory 220.

As described with reference to FIG. 9A, the storage controller 210 may store an update firmware image FW_NEW in the nonvolatile memory 220 and may trigger a reset of the storage device 200. The storage device 200 may be rebooted in response to a reset trigger, and the storage controller 210 may execute updated firmware.

Figure 10A:
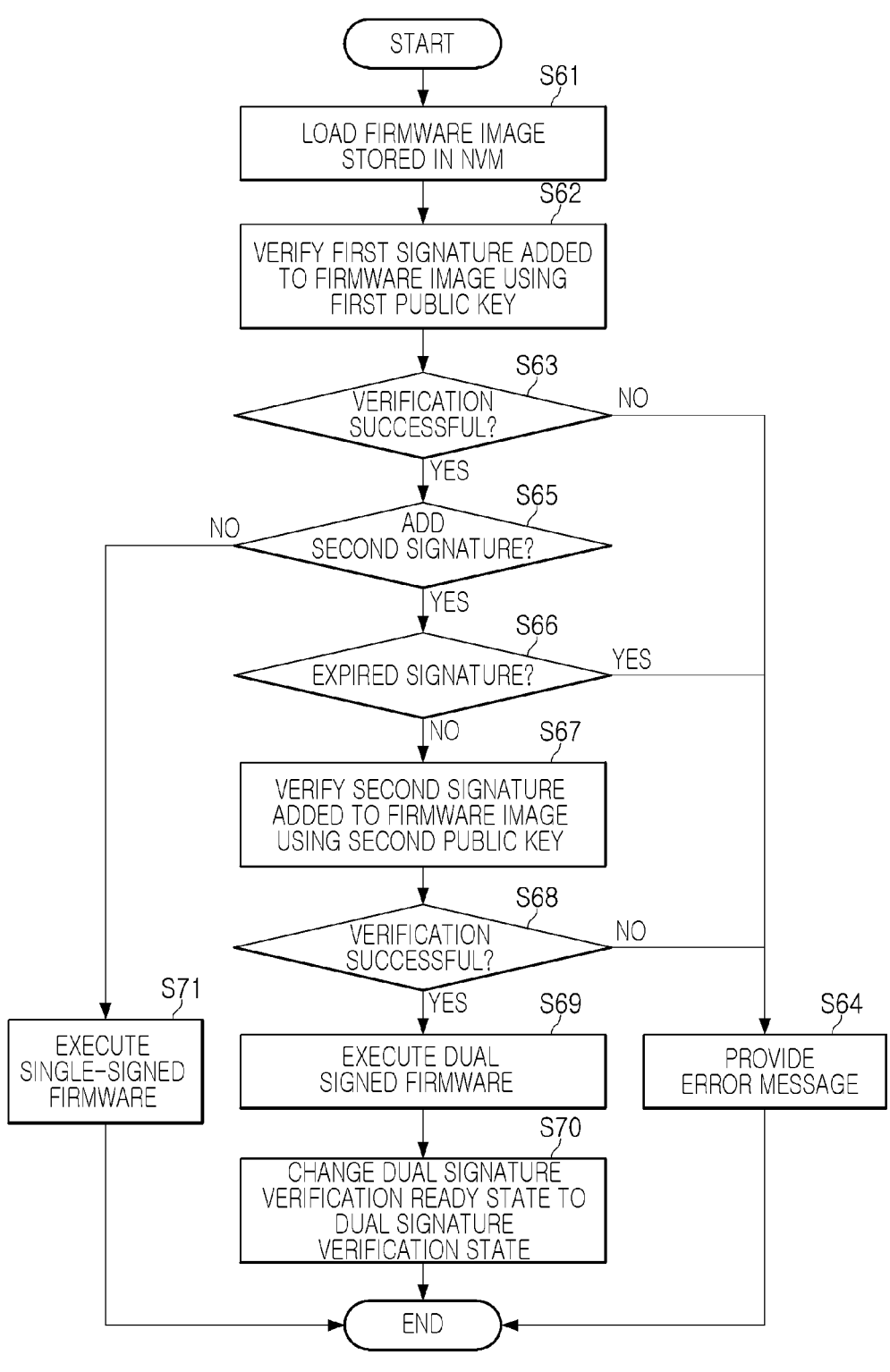
FIG. 10A is a flowchart illustrating a method of executing firmware of a storage device in a dual signature verification ready state according to an example embodiment of the present disclosure.
Figure 10B:
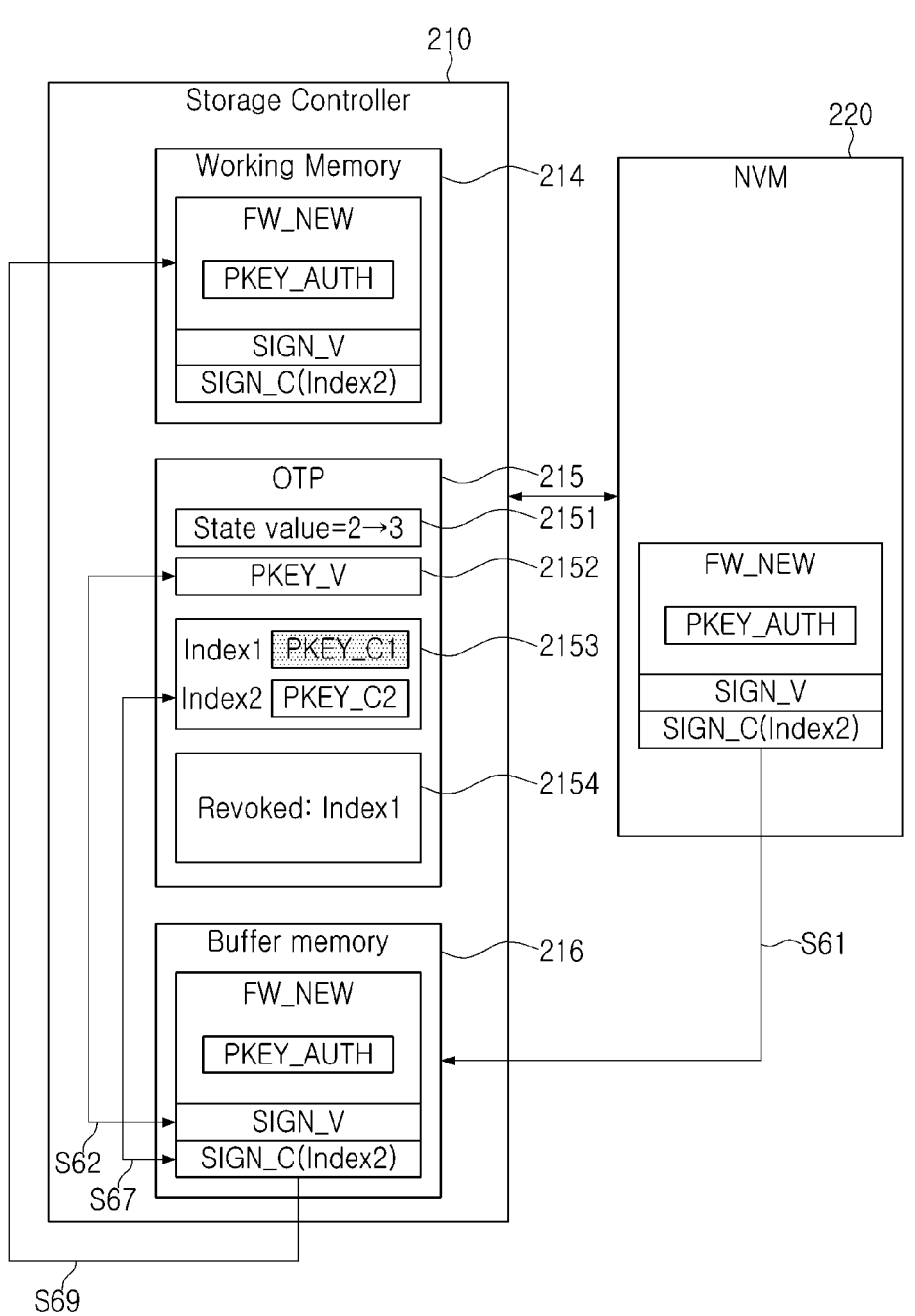
FIG. 10B is a diagram illustrating a method of executing firmware of a storage device in a dual signature verification ready state according to an example embodiment of the present disclosure.

FIG. 10A is a flowchart illustrating a method of executing firmware of a storage device in a dual signature verification ready state according to an example embodiment of the present disclosure. FIG. 10B is a diagram illustrating a method of executing firmware of a storage device in a dual signature verification ready state according to an example embodiment of the present disclosure.

Referring to FIG. 10A, the method of executing firmware according to the example embodiment may be started in response to a reset of the storage device 200. For example, the method of executing firmware may be initiated in response to a power-on reset (POR) or may be initiated in response to a reset trigger described with reference to FIG. 9A.

In operation S61, the storage controller 210 may load the firmware image stored in the nonvolatile memory 220 into the buffer memory 216. For example, the firmware image may include a firmware image stored in the nonvolatile memory device (e.g., storage device 200) in response to a firmware update command.

The storage controller 210 may verify the first signature SIGN_V added to (or included in) the firmware image with the first public key PKEY_y stored in the OTP memory 215 in operation S62, and may determine whether the verification succeeds in operation S63.

Based on verification of the first signature SIGN_V failing ("No" in operation S63), the storage controller 210 may provide an error message to the host in operation S64. The error message may be a message indicating boot failure of the storage device 200.

In the case in which the verification of the first signature SIGN_V is successful ("Yes" in operation S63), the storage controller 210 may determine whether the second signature is added to (or included in) the firmware image in operation S65.

When the second signature is not added to (or not included in) the firmware image ("No" in operation S65), the firmware image may be a single signed firmware image. In the dual signature verification ready state (e.g., ST2 of FIG. 6B), the storage controller 210 may allow execution of firmware corresponding to a single signed firmware image in operation S71.

Based on the second signature being added to (or included in) the firmware image ("Yes" in operation S65), the storage controller 210 may determine whether the second signature is a signature related to the discarded second public key in operation S66. For example, the firmware image may include an identifier indicating a second public key corresponding to the second signature, and the storage controller 210 may determine whether the second signature is a signature related to the discarded second public key by finding the identifier in the discarded public key area 2154.

Based on the second signature being a signature related to the discarded second public key ("Yes" in operation S66), the storage controller 210 may perform operation S64. In the case in which the second signature is not a signature related to the discarded second public key ("No" in operation S66), the storage controller 210 may verify the second signature added to (or included in) the firmware image using the second public key in operation S67 and may determine whether the verification succeeds in operation S68.

Based on verification of the second signature failing ("No" in operation S68), the storage controller 210 may perform operation S64. In the case in which the verification of the second signature is successful ("Yes" in operation S68), the storage controller 210 may load at least a portion of the firmware image into the working memory 214 in operation S69, and may execute firmware corresponding to the firmware image.

Based on verification of the second signature being successful, the firmware image loaded into the buffer memory 216 may be a dual signed firmware image. When the dual-signed firmware is executed in operation S69, the storage controller 210 may change the dual signature verification ready state (e.g., ST2 of FIG. 6B) to the dual signature verification state (e.g., ST3 of FIG. 6B) in operation S70.

FIG. 10B illustrates the storage controller 210 and the nonvolatile memory 220 described with reference to FIG. 5. The storage controller 210 may include a working memory 214, an OTP memory 215 and a buffer memory 216.

As described with reference to FIG. 10A, the firmware image FW_NEW stored in the nonvolatile memory 220 may be loaded into the buffer memory 216 in operation S61. For example, the storage controller 210 may load a firmware image FW_NEW by executing a boot loader stored in a boot read-only memory (ROM) included in the storage controller 210.

In operation S62, the first signature SIGN_V added to (or included in) the firmware image FW_NEW loaded in the buffer memory 216 may be verified using the first public key PKEY_y stored in the OTP memory 215. Based on the second signature SIGN_C related to the second public key PKEY_C2 not discarded being added to (or included in) the firmware image FW_NEW, the second signature SIGN_C may be verified by the second public key PKEY_C2 in operation S67.

Based on both the first signature SIGN_V and the second signature SIGN_C added to (or included in) the firmware image FW_NEW being verified, the storage controller 210 may load at least a portion of the firmware image FW_NEW into the working memory 214 and may execute the firmware. The storage controller 210 may change the dual signature verification ready state (e.g., ST2 of FIG. 6B) to the dual signature verification state (e.g., ST3 of FIG. 6B) by changing the state value stored in the state value area 2151 of the OTP memory 215 from the second state to the third state.

In an example embodiment, the storage controller 210 may prevent execution of a single signed firmware image by changing the dual signature verification ready state (e.g., ST2 of FIG. 6B) to a dual signature verification state (e.g., ST3 of FIG. 6B) once the firmware corresponding to the dual signed firmware image is executed. Accordingly, security of the storage controller 210 may be improved.

The method of updating firmware and the method of executing firmware in the dual signature verification state (e.g., ST3 of FIG. 6B) may be similar to the method of updating firmware and the method of executing firmware in the dual signature verification ready state (e.g., ST2 of FIG. 6B), but there may be a difference in that authentication of a single signed firmware image is not allowed. Hereinafter, the method of updating firmware and the method of executing firmware of the storage device 200 in the dual signature verification state (e.g., ST3 of FIG. 6B) will be described focusing on the above difference with reference to FIGS. 11 and 12.

FIG. 11 is a flowchart illustrating a method of updating firmware of a storage device in a dual signature verification state according to an example embodiment.

Operation S81 to operation S85 may be similar to operation S51 to operation S55 described with reference to FIG. 9A, and repeated description may be omitted.

In operation S86, the storage controller 210 may determine whether a second signature is added to (or included in) the firmware image for which a supplier signature is verified. When the second signature is not added to (or not included in) the firmware image ("No" in operation S86), the storage controller 210 may provide an error message to the host 100 in operation S85. That is, in the dual signature verification state (e.g., ST3 of FIG. 6B), the storage controller 210 may prohibit updating of firmware corresponding to a single signed firmware image.

Based on the second signature being added to (or included in) the firmware image ("Yes" in operation S86), the storage controller 210 may perform operations S87 to operation S89. Operations S87 to S89 may be similar to operations S57 to S59 described with reference to FIG. 9A.

FIG. 12 is a flowchart illustrating a method of executing firmware of a storage device in a dual signature verification state according to an example embodiment.

Operation S91 to operation S94 may be similar to operation S61 to operation S64 described with reference to FIG. 10A, and repeated description may be omitted.

In operation S95, the storage controller 210 may determine whether a second signature is added to (or included in) the firmware image for which a supplier signature is verified. When the second signature is not added to (or not included in) the firmware image ("No" in operation S95), the storage controller 210 may provide an error message to the host 100 in operation S94. That is, in the dual signature verification state (e.g., ST3 of FIG. 6B), the storage controller 210 may prohibit execution of firmware corresponding to a single signed firmware image.

Based on the second signature being added to (or included in) the firmware image ("Yes" in operation S95), the storage controller 210 may perform operation S96 to operation S99. Operations S96 to S99 may be similar to operations S66 to S69 described with reference to FIG. 10A.

In an example embodiment, the storage device 200 may be shipped in a single signature verification state (e.g., ST1 of FIG. 6B), and the storage device 200 may store the customer public key in the OTP memory in response to a command authenticated using a public key for customer authentication included in a firmware image authenticated using a vendor public key. The storage device 200 may switch a single signature verification state (e.g., ST1 of FIG. 6B) to a dual signature verification ready state (e.g., ST2 of FIG. 6B) after initially storing the customer public key in the OTP, and may attempt dual signature verification for the firmware image in response to a firmware update command. The storage device 200 may switch the dual signature verification ready state (e.g., ST2 of FIG. 6B) to the dual signature verification state (e.g., ST3 of FIG. 6B) after first executing the dual-signed firmware. In an example embodiment, versatility and security of the storage device 200 may be improved, and convenience of the host 100 to enter a customer public key into the storage device 200 may be improved.

According to example embodiments, the storage controller may support a host to enter a host public key for authenticating the firmware image to which a signature of the host is added without intervention of a firmware vendor.

The storage controller may authenticate the firmware image to which the signature of the host is added using a host public key entered by a valid host, such that security may improve.

The storage controller may verify only a single signature of the firmware vendor in the firmware image at the time of shipment, and may be switched to verify the dual signature of the firmware vendor and the host in the firmware image in response to entering the host public key, thereby improving versatility and security.

In the method of providing a firmware image, a host may generate dual-signed firmware which may be verified by a storage controller without intervention of a firmware vendor and may provide the generated firmware to the storage device.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

Each of the embodiments provided in the above description is not excluded from being associated with one or more features of another example or another embodiment also provided herein or not provided herein but consistent with the disclosure.

While the disclosure has been particularly shown and described with reference to embodiments thereof, it will be understood that various changes in form and details may be made therein without departing from the spirit and scope of the following claims.

What is claimed is:

1. A storage controller configured to control a nonvolatile memory, the storage controller comprising:
   a one-time programmable (OTP) memory configured to store a first public key; and
   a processor configured to:
   verify a firmware image including a host authentication public key using the first public key, based on a first signature added to the firmware image,
   receive a storage command comprising at least one second public key and a first host authentication signature for the at least one second public key, and
   store the at least one second public key in the OTP memory based on the first host authentication signature being verified using the host authentication public key,
   wherein the processor is further configured to store a state value indicating a dual signature verification ready state in the OTP memory after storing the at least one second public key in the OTP memory.

2. The storage controller of claim 1, wherein, based on the first signature added to an update firmware image being verified using the first public key in the dual signature verification ready state and without a second signature being added to the update firmware image, the processor is further configured to allow updating or executing of firmware corresponding to the update firmware image.

3. The storage controller of claim 1, wherein, based on verification of a second signature added to an update firmware image failing in the dual signature verification ready state, the processor is further configured to prohibit updating or executing of firmware corresponding to the update firmware image.

4. The storage controller of claim 1, further comprising a buffer memory configured to buffer an update firmware image received from a host,
   wherein the processor is further configured to:
   verify the first signature added to the update firmware image using the first public key,
   verify a second signature added to the update firmware image using one of the at least one second public key, and
   control the nonvolatile memory to store the update firmware image based on the verification of the first signature and the verification of the second signature being completed.

5. The storage controller of claim 4, wherein the processor is further configured to:
   trigger a reset of the storage controller based on the update firmware image in the nonvolatile memory being stored,
   load the update firmware image from the nonvolatile memory into the buffer memory in response to triggering the reset,
   execute firmware corresponding the update firmware image based on verification of the first signature and verification of the second signature added to the update firmware image loaded in the buffer memory being completed, and
   store a state value indicating a dual signature verification state in the OTP memory.

6. The storage controller of claim 5, wherein the processor is further configured prohibit updating or executing of firmware corresponding to the update firmware image based on the first signature added to the update firmware image being verified using the first public key in the dual signature verification state without the second signature being added to the update firmware image.

7. The storage controller of claim 1, wherein the processor is further configured to:
   receive a revocation command comprising a third public key to be discarded and a second host authentication signature for the third public key to be discarded, the at least one second public key comprising the third public key, and
   discard the third public key based on the second host authentication signature being verified using the host authentication public key.

8. The storage controller of claim 7, wherein the processor is further configured to storing an identifier of the discarded third public key in the OTP memory.

9. The storage controller of claim 8, wherein the processor is further configured to store the discarded third public key by overwriting dummy data in an area of the OTP memory.

10. The storage controller of claim 1, wherein the first public key comprises a public key generated by a firmware vendor.

11. A storage controller configured to control a nonvolatile memory, the storage controller comprising:
   a one-time programmable (OTP) memory configured to store a first public key;
   a buffer memory configured to buffer an update firmware image received from a host; and
   a processor configured to:
   authenticate an existing firmware image including a host authentication public key using at least the first public key,
   authenticate a second public key using the host authentication public key, and store the second public key to the OTP memory, authenticate the update firmware image by verifying a first signature added to the update firmware image using the first public key and verifying a second signature added to the update firmware image using the second public key, and control the nonvolatile memory to store the update firmware image based on the authentication being completed.

12. The storage controller of claim 11, wherein the first public key is stored in the OTP memory when the storage controller is manufactured.

13. The storage controller of claim 11, wherein the processor is further configured to store the second public key in the OTP memory in response to a storage command comprising the second public key and a host authentication signature for the second public key.

14. The storage controller of claim 11, wherein the OTP memory comprises an area configured to store a signature verification state value, and wherein the processor is further configured to update the signature verification state value in response to a first execution of the update firmware image that is authenticated using the first public key and the second public key.

15. A method of operating a storage device, comprising:

based on a first signature added to a firmware image including a host authentication public key being verified using a first public key, receiving a storage command comprising at least one second public key and a first host authentication signature for the at least one second public key;

verifying the first host authentication signature; and based on successfully verifying the first host authentication signature:

storing the at least one second public key;

determining whether a signature state value of the storage device corresponds to a first state value of a single signature verification state; and based on determining that the signature state value of the storage device corresponds to the first state value, switching the signature state value to a second state value of a dual signature verification ready state.

* * * * *